(12) United States Patent
Lee et al.

(10) Patent No.: US 11,016,330 B2
(45) Date of Patent: *May 25, 2021

(54) COLOR SUBSTRATE INCLUDING RETROREFLECTIVE LAYER AND DISPLAY DEVICE INCLUDING THE COLOR SUBSTRATE

(71) Applicant: SAMSUNG DISPLAY CO., LTD., Yongin-si (KR)

(72) Inventors: Heekeun Lee, Yongin-si (KR); Jangil Kim, Yongin-si (KR); Keunwoo Park, Yongin-si (KR); Suwan Woo, Yongin-si (KR); Yeogeon Yoon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/841,372

(22) Filed: Apr. 6, 2020

(65) Prior Publication Data

US 2020/0233260 A1  Jul. 23, 2020

Related U.S. Application Data

(63) Continuation of application No. 16/258,475, filed on Jan. 25, 2019, now Pat. No. 10,649,269, which is a
(Continued)

(30) Foreign Application Priority Data

Oct. 21, 2016  (KR) .................. 10-2016-0137707

(51) Int. Cl.
*G02F 1/1335* (2006.01)
*G02F 1/139* (2006.01)
(Continued)

(52) U.S. Cl.
CPC ...... *G02F 1/133514* (2013.01); *G02F 1/1393* (2013.01); *G02F 1/13718* (2013.01);
(Continued)

(58) Field of Classification Search
None
See application file for complete search history.

(56) References Cited

U.S. PATENT DOCUMENTS 5,493,430 A  2/1996  Lu et al.
6,411,360 B1  6/2002  Matsuyama et al.
(Continued)

FOREIGN PATENT DOCUMENTS

KR  10-2012-0042526 A  5/2012
KR  10-2013-0005175 A  1/2013

*Primary Examiner* — Tracie Y Green
(74) *Attorney, Agent, or Firm* — Lewis Roca Rothgerber Christie LLP

(57) ABSTRACT

A color substrate and a display device including the same. The color substrate includes: a substrate including first and second pixel regions spaced apart from each other, and a light shielding region between the first and second pixel regions; a first color conversion layer over the first pixel region and configured to convert incident light into first color light; a second color conversion layer over the second pixel region and configured to convert the incident light into second color light; and a retroreflective layer over the light shielding region and configured to retroreflect incident light through the first and second color conversion layer.

20 Claims, 14 Drawing Sheets

Related U.S. Application Data continuation of application No. 15/697,282, filed on Sep. 6, 2017, now Pat. No. 10,197,844.

(51) Int. Cl.
  *G02F 1/137* (2006.01)
  *G02F 1/1343* (2006.01)
  *G02F 1/13357* (2006.01)

(52) U.S. Cl.
  CPC .. *G02F 1/133617* (2013.01); *G02F 1/134309* (2013.01); *G02F 1/133512* (2013.01); *G02F 2203/02* (2013.01)

(56) References Cited

U.S. PATENT DOCUMENTS

| | | | |
|---|---|---|---|
| 8,482,702 | B2 | 7/2013 | Asaoka et al. |
| 8,564,746 | B2 | 10/2013 | Kim et al. |
| 9,958,727 | B2 | 5/2018 | Oba et al. |
| 10,197,844 | B2 * | 2/2019 | Lee ................. G02F 1/13718 |
| 10,649,269 | B2 * | 5/2020 | Lee ................. G02F 1/133617 |
| 2004/0190143 | A1 | 9/2004 | Harasawa et al. |
| 2005/0046321 | A1 | 3/2005 | Suga et al. |
| 2011/0038048 | A1 | 2/2011 | Kobayashi et al. |
| 2011/0293858 | A1 | 12/2011 | Xu et al. |
| 2012/0099199 | A1 | 4/2012 | Vasylyev |
| 2013/0010229 | A1 | 1/2013 | Shin et al. |
| 2013/0038223 | A1 | 2/2013 | Aoki |
| 2015/0042935 | A1 | 2/2015 | Yamamoto et al. |
| 2015/0228232 | A1 | 8/2015 | Lee et al. |
| 2016/0172615 | A1 | 6/2016 | Kim et al. |
| 2017/0205664 | A1 | 7/2017 | Cho et al. |
| 2017/0363781 | A1 | 12/2017 | Seder et al. |
| 2017/0368954 | A1 | 12/2017 | Salter et al. |
| 2018/0127915 | A1 | 5/2018 | Nowak et al. |
| 2018/0314112 | A1 | 11/2018 | Chen et al. |

* cited by examiner

COLOR SUBSTRATE INCLUDING RETROREFLECTIVE LAYER AND DISPLAY DEVICE INCLUDING THE COLOR SUBSTRATE

CROSS-REFERENCE TO RELATED APPLICATIONS

This application is a continuation of U.S. patent application Ser. No. 16/258,475, filed Jan. 25, 2019, which is a continuation of U.S. patent application Ser. No. 15/697,282, filed Sep. 6, 2017, now U.S. Pat. No. 10,197,844, which claims priority to and the benefit of Korean Patent Application No. 10-2016-0137707, filed Oct. 21, 2016, the entire content of all of which is incorporated herein by reference.

BACKGROUND

1. Field

One or more aspects of example embodiments of the present disclosure relate to a color substrate including a retroreflective layer and a display device including the color substrate.

2. Description of the Related Art

A liquid crystal display device is a widely used display device and includes a liquid crystal layer including liquid crystal molecules configured to assume different orientations according to an applied electric field (e.g., voltage). The liquid crystal display device may be configured to display an image by controlling the polarization of incident light through the liquid crystal layer.

The liquid crystal display device includes red, blue, and green color filters to form light of specific colors. However, when white light emitted by a backlight source passes through a red color filter, a green color filter, and/or a blue color filter, the light intensity is reduced by about ⅓ at each of the red, green, and blue color filters, thereby reducing the light efficiency of the device.

A photo-luminescent liquid crystal display (PL-LCD) apparatus has been suggested to overcome the low light efficiency of LCD displays and to increase or improve color reproducibility. The PL-LCD apparatus includes a quantum dot-color conversion layer (QD-CCL) instead of the color filters used in a general LCD apparatus. The PL-LCD apparatus displays a color image when short wavelength light, such as ultraviolet (UV) light or blue light generated from a light source, is irradiated onto a color conversion layer (CCL) to thereby generate visible light of different colors that is subsequently controlled by a liquid crystal layer.

Since the CCL generates light having a different wavelength from light emitted by the light source, as opposed to transmitting the light source through a color filter, light emitted by the CCL is irradiated in various directions. Furthermore, a portion of the light emitted by the light source may be transmitted without being converted in a CCL. Accordingly, adjacent first and second color lights emitted by adjacent CCLs and/or a third color light emitted by the light source may mix, thereby changing the apparent colors of each. Color reproducibility may be reduced due to this color mixing.

A black matrix may be positioned between pixel regions to prevent or reduce color mixing. When the black matrix is formed of a reflective material, light emitted by each CCL may be reflected by the black matrix and irradiated onto an adjacent CCL. In this case, color mixing may increase. When the black matrix is formed of a light-absorbing material, the light efficiency may be reduced when light emitted by the CCLs is absorbed by the black matrix.

SUMMARY

One or more aspects of example embodiments of the present disclosure provide a color substrate configured to improve color reproducibility and light efficiency in a display device, and a display device including the same.

Additional aspects will be set forth in part in the description which follows and, in part, will be apparent from the description, or may be learned by practice of the presented example embodiments.

According to one or more example embodiments of the present disclosure, a color substrate includes a substrate including first and second pixel regions spaced apart from each other, a light shielding region between the first and second pixel regions, a first color conversion layer over the first pixel region and configured to convert incident light into a first color light, a second color conversion layer over the second pixel region and configured to convert the incident light into a second color light, a base material layer over the light shielding region, and first beads including a first portion exposed from the base material layer.

The first color conversion layer may include first quantum dots configured to emit the first color light upon being excited by the incident light, the first color light having a wavelength longer than that of the incident light; and the second color conversion layer may include second quantum dots configured to emit the second color light upon being excited by the incident light, the second color light having a wavelength longer than that of the incident light.

The color substrate may further include a retroreflective layer including the base material layer and the first beads and configured to retroreflect light incident from the first and second color conversion layer.

The retroreflective layer may further include second beads dispersed in the based material layer, the based material layer surrounding an entire surface of the second beads.

The first beads may be disposed in an upper portion of the base material layer.

The first beads may include the first portion projecting from a top surface of the base material layer and a second portion embedded in the base material layer.

The first beads may further include a reflective layer surrounding the second portion and exposing the first portion.

The color substrate may further include a color filter layer between the substrate and the first and second color conversion layers, the color filter layer being configured to transmit the first and second color lights and to reflect or absorb incident light.

The color substrate may further include a color filter layer over the first and second color conversion layers, the color filter layer being configured to transmit incident light and to reflect or absorb the first and second color lights.

The color substrate may further include a color filter layer surrounding the side surfaces and upper surfaces of the first and second color conversion layers, the color filter layer being configured to selectively transmit incident light, and a light shielding sidewall over a part of the color filter layer between the first and second color conversion layers.

The color substrate may further include a light shielding sidewall surrounding at least some of the side surfaces of the first and second color conversion layers, and a color filter layer over the first and second color conversion layers and the light shielding sidewall, the color filter layer being configured to selectively transmit the incident light.

The color substrate may further include a color filter layer over a third pixel region spaced apart from the first and second pixel regions of the substrate, the color filter layer being configured to transmit the incident light.

The color substrate may further include a third color conversion layer over a third pixel region spaced apart from the first and second pixel regions of the substrate, the third color conversion layer being configured to convert the incident light into a third color light.

The base material layer may be between the first and second color conversion layers in a horizontal direction, and the first portion of the first beads may be exposed from top and side surfaces of the base material layer.

According to one or more example embodiments, a color substrate includes a substrate having first and second pixel regions spaced apart from each other, and a light shielding region between the first and second pixel regions, a first color conversion layer over the first pixel region and configured to convert incident light into first color light, a second color conversion layer over the second pixel region and configured to convert the incident light into second color light, and a retroreflective layer over the light shielding region and configured to retroreflect light incident from the first and second color conversion layer.

The retroreflective layer may include a retroreflective surface having concave patterns.

Each of the concave patterns may be a corner cube pattern having three reflective surfaces positioned orthogonally to each other.

According to one or more example embodiments, a display device includes a display unit including first and second pixels, and a color substrate over the display unit and including first and second pixel regions respectively overlapping the first and second pixels, wherein the color substrate includes: a substrate including the first and second pixel regions, and a light shielding region between the first and second pixel regions; a first color conversion layer over the first pixel region, the first color conversion layer being configured to convert incident light into a first color light; a second color conversion layer over the second pixel region, the second color conversion layer being configured to convert the incident light into a second color light; a base material layer over the light shielding region; and first beads including a first portion exposed from the base material layer.

The display device may further include a backlight device configured to irradiate incident light to the color substrate, and a liquid crystal layer between the display unit and the color substrate.

Each of the first and second pixels may include an organic emission layer to emit the incident light.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
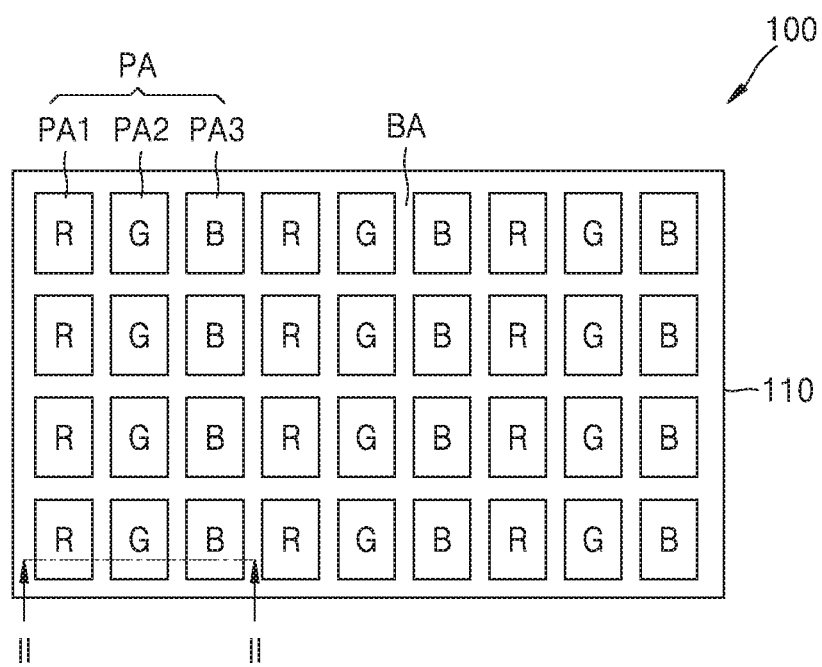
FIG. 1 is a plan view of a color substrate according to an example embodiment of the present disclosure.

Reference will now be made in more detail to example embodiments, examples of which are illustrated in the accompanying drawings, wherein like reference numerals refer to like elements throughout and duplicative descriptions thereof may not be provided. In this regard, the present example embodiments may have different forms and should not be construed as being limited to the descriptions set forth herein. Accordingly, the example embodiments are merely described below, by referring to the figures, to explain aspects of the present description. Expressions such as "at least one of", "one of", and "selected from", when preceding a list of elements, modify the entire list of elements and do not modify the individual elements of the list.

It will be understood that when a layer, region, or component is referred to as being "on", "provided on", "positioned on", or "formed on" another layer, region, or component, it can be directly or indirectly formed on the other layer, region, or component. That is, for example, intervening layers, regions, or components may be present. The sizes and thicknesses of elements in the drawings may be exaggerated for convenience of explanation. In other words, since sizes and thicknesses of components in the drawings are arbitrarily illustrated for convenience of explanation, the following embodiments are not limited thereto.

It will be understood that when a layer, region, or component is described as being connected to another portion of the embodiment, the layer, region, or component may be directly connected to the portion of the embodiment, or an intervening layer, region, or component may exist. For example, when a layer, region, or component is described as being connected to another portion of the embodiment, the layer, region, or component may be directly connected to the portion of the embodiment, or may be indirectly connected to the portion of the embodiment through another layer, region, or component.

It will be understood that although the terms "first", "second", etc. may be used herein to describe various components, these components should not be limited by these terms. These components are only used to distinguish one component from another. An expression used in the singular encompasses the expression of the plural, unless it has a clearly different meaning in the context. In addition, it will be understood that when a unit is referred to as "comprising" another element, it may not exclude other elements but may further include other elements unless specifically indicated otherwise.

Figure 2:
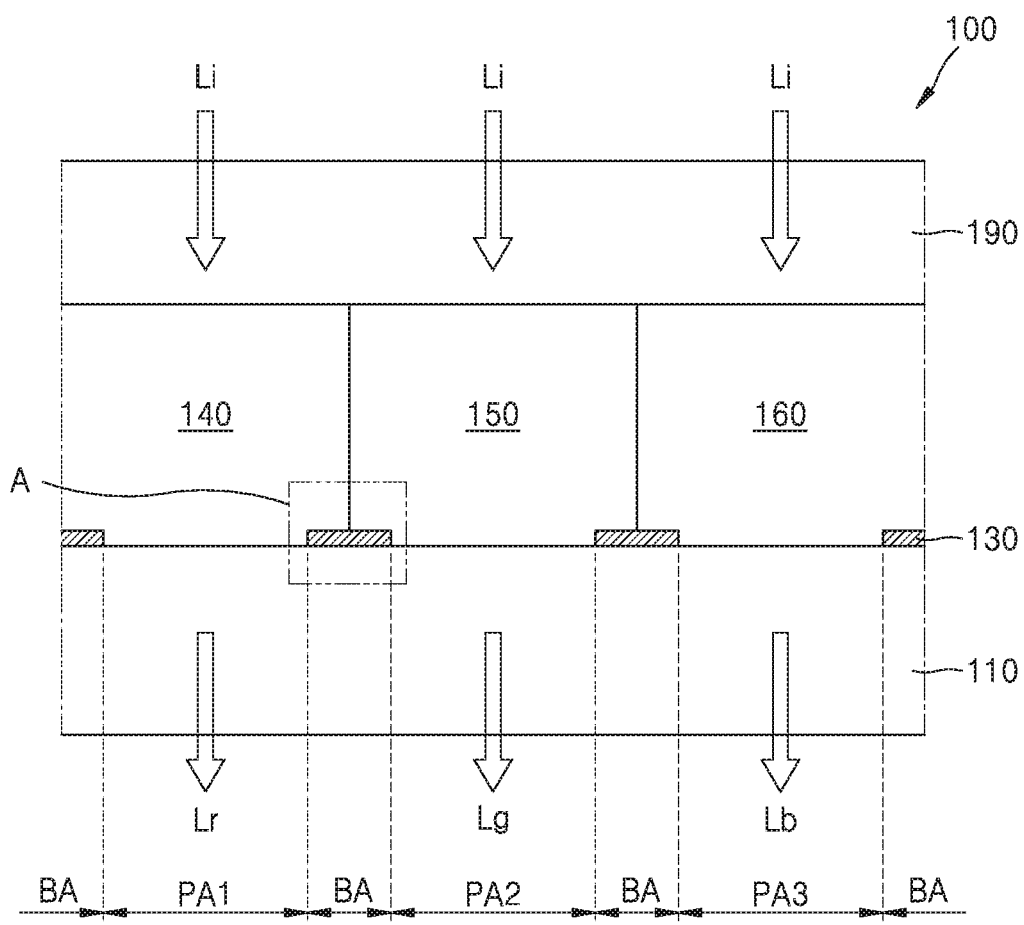
FIG. 2 is a cross-sectional view of a color substrate according to an example embodiment of the present disclosure.

FIG. 1 is a plan view of a color substrate according to an example embodiment of the present disclosure. FIG. 2 is a cross-sectional view of the color substrate according to FIG. 1, and shows a section taken along line II-II.

Referring to FIGS. 1 and 2, a color substrate 100 includes a substrate 110, a retroreflective layer 130, a first color conversion layer (CCL) 140, and a second CCL 150. The substrate 110 includes a first pixel region (e.g., pixel area) PA1 and a second pixel region PA2 spaced apart from each other, and a light shielding region (e.g., blocking area) BA positioned between and around the first and second pixel regions PA1 and PA2. The first CCL 140 is positioned over the first pixel region PA1 and converts incident light Li into a first color light Lr. The second CCL 150 is positioned over the second pixel region PA2 and converts the incident light Li into a second color light Lg. The retroreflective layer 130 is positioned over the light shielding region BA and retroreflects incident light through the first and second CCLs 140 and 150.

The color substrate 100 may further include a light-emitting layer 160 positioned over a third pixel region PA3, which is spaced apart from the first and second pixel regions PA1 and PA2. When the incident light Li is incident on the light-emitting layer 160, the light-emitting layer 160 may emit a third color light Lb. The light-emitting layer 160 may be a light-transmitting layer transmitting the incident light Li of the third color (e.g., Lb), or a third CCL converting the incident light Li into the third color light Lb. When the color substrate 100 receives the incident light Li and emits the first through third color lights Lr, Lg, and Lb, the color substrate 100 may function as a color filter.

The color substrate 100 may further include a planarization layer 190 having a flat upper surface over the first and second CCLs 140 and 150 and the light-emitting layer 160.

Referring to FIG. 1, a pixel region PA and the light shielding region BA are defined in the substrate 110. The pixel region PA may emit light, and is surrounded by the light shielding region BA. The pixel region PA may be divided into the first through third pixel regions PA1 through PA3 corresponding to different colors of emitted light. For example, the first pixel region PA1 is a region from which the first color light Lr is emitted, the second pixel region PA2 is a region from which the second color light Lg is emitted, and the third pixel region PA3 is a region from which the third color light Lb is emitted. FIG. 1 depicts an example arrangement of each of the first through third pixel regions PA1 through PA3, but embodiments of the present disclosure are not limited thereto. The arrangement of each of the first through third pixel regions PA1 through PA3 may vary according to suitable arrangements of pixels of a display device.

The first color light Lr may be red light, the second color light Lg may be green light, and the third color light Lb may be blue light. The red light may have a peak wavelength of about 580 nm to about 750 nm. The green light may have a peak wavelength of about 495 nm to about 580 nm. The blue light may have a peak wavelength of about 400 nm to about 495 nm.

The light shielding region BA, which does not emit light, may be arranged in a mesh shape or pattern around the first through third pixel regions PA1 through PA3. Light may leak from the display device when light is emitted through the light shielding region BA.

The substrate 110 is a transparent substrate through which the first and second color lights Lr and Lg emitted by the first and second CCLs 140 and 150 may be emitted through the first and second pixel regions PA1 and PA2. The third color light Lb may be emitted through the third pixel region PA3 of the substrate 110.

The substrate 110 may be formed of any suitable material, and may be an insulating material, for example, glass, plastic, and/or crystal. The substrate 110 may be formed of an organic high-molecular material, for example, such as polycarbonate (PC), polyethylene terephthalate (PET), polyethylene (PE), polypropylene (PP), polysulfone (PSF), polymethylmethacrylate (PMMA), triacetylcellulose (TAC), cyclo-olefin polymer (COP), cyclo-olefin polymer, and/or cyclo-olefin copolymer (COC). The material for forming the substrate 110 may be selected according to its mechanical strength, thermal stability, transparency, surface smoothness, ease of handling, and/or water repellency.

The retroreflective layer 130 is positioned over the light shielding region BA and retroreflects incident light through the first and second CCLs 140 and 150. As used herein, the terms "retroreflect" and "retroreflection" indicate reflection of incident light from a light source back to that light source. Although incident light and retroreflected light are ideally parallel to each other, the terms as used in the current specification may indicate reflection of light in an approximate direction of the incident light.

According to an example embodiment of the present disclosure, most of (e.g., half or more) of the first color light Lr emitted by the first CCL 140 and reflected by the retroreflective layer 130 may be incident on the first CCL 140. Even if a portion of the first color light Lr reflected by the retroreflective layer 130 is incident on the second CCL 150, the first color light Lr is included within a range of the present example embodiment as long as half or more of the first color light Lr is incident on the first CCL 140. Most of (e.g., half or more) of the second color light Lg emitted by the second CCL 150 and reflected by the retroreflective layer 130 may be incident on the second CCL 150.

The retroreflective layer 130 will be described below in more detail with reference to FIGS. 3, 4, 5A, and 5B.

The first CCL 140 is positioned over the first pixel region PA1, and is configured to convert the incident light Li into the first color light Lr and emit the first color light Lr toward the substrate 110. The first CCL 140 may include first quantum dots configured to emit the first color light Lr having a wavelength longer than that of the incident light Li upon being excited by the incident light Li.

The second CCL 150 is positioned over the second pixel region PA2, and is configured to convert the incident light Li into the second color light Lg and emit the second color light Lg toward the substrate 110. The second CCL 150 may include second quantum dots configured to emit the second color light Lg having a wavelength longer than that of the incident light Li upon being excited by the incident light Li.

The light-emitting layer 160 is positioned over the third pixel region PA3 and emits the third color light Lb toward the substrate 110.

According to an example embodiment of the present disclosure, the incident light Li may be blue light. The light-emitting layer 160 may be a light-transmitting layer transmitting the incident light Li.

According to an example embodiment of the present disclosure, the incident light Li may be ultraviolet (UV) light, wherein the UV light has a peak wavelength of about 200 nm to about 400 nm. The light-emitting layer 160 may be a third light conversion layer converting the incident light Li to the third color light Lb and emitting the same, and may include third quantum dots emitting the third color light Lb having a wavelength longer than that of the incident light Li upon being excited by the incident light Li.

The planarization layer 190 may be positioned over the substrate 110 to cover the first and second CCLs 140 and 150 and the light-emitting layer 160. The planarization layer 190 may be transparent, such that the incident light Li irradiates the first and second CCLs 140 and 150. The planarization layer 190 may be formed of a transparent organic material, such as a polyimide resin, an acryl resin, and/or a resist material. The planarization layer 190 may be formed using a wet method, such as a slit coating method and/or a spin coating method, or a dry method, such as a chemical vapor deposition method and/or a vacuum deposition method. However, materials and methods of forming the planarization layer 190 are not limited thereto.

A barrier wall may be positioned over the retroreflective layer 130. The barrier wall may be positioned around the first and second CCLs 140 and 150 and the light-emitting layer 160. Each of the first and second CCLs 140 and 150 and the light-emitting layer 160 may be formed on the retroreflective layer 130 in a concave space defined by the barrier walls using an inkjet method. The barrier wall may be formed of a material that is able to absorb or reflect the first through third color lights Lr, Lg, and Lb.

Figure 3:
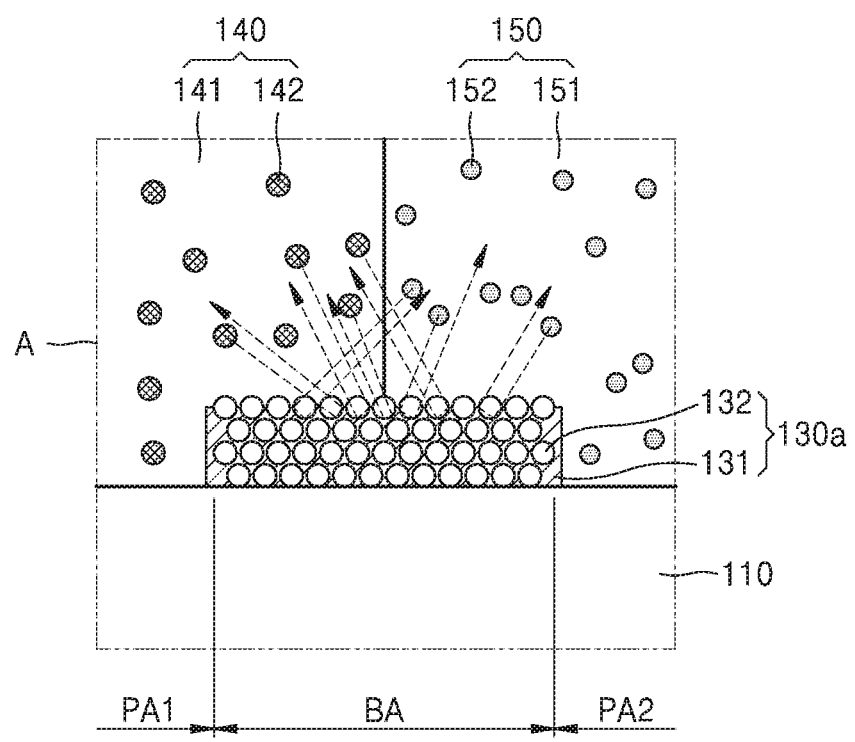
FIG. 3 is an enlarged cross-sectional view of a part of a color substrate according to an example embodiment of the present disclosure.

FIG. 3 is an enlarged cross-sectional view of part A in FIG. 2, according to an embodiment of the present disclosure.

FIG. 3 illustrates first and second CCLs 140 and 150 respectively positioned over the first and second pixel regions PA1 and PA2 as well as the light shielding region BA, and retroreflective layer 130a positioned over the light shielding region BA of the substrate 110.

The first CCL 140 includes a first photosensitive polymer 141 in which first quantum dots 142 are dispersed. The second CCL 150 includes a second photosensitive polymer 151 in which second quantum dots 152 are dispersed.

Each of the first and second CCLs 140 and 150 may include a semiconductor nanocrystal-polymer complex and may be patterned. A patterned semiconductor nanocrystal-polymer complex may be obtained using a photolithographic process after curing the first and second CCLs 140 and 150 by coating, i.e., with a semiconductor nanocrystal-polymer solution. However, embodiments of the present disclosure are not limited thereto. The semiconductor nanocrystal may include quantum dots (e.g., an isotropic semiconductor nanocrystal) or, e.g., a quantum confined nanostructure.

The first quantum dots 142 may emit the first color light Lr having a wavelength longer than that of the incident light Li upon being excited by the incident light Li. For example, the first quantum dots 142 absorb blue light and may emit red light having a wavelength longer than that of the blue light. The second quantum dots 152 may emit the second color light Lg having a wavelength longer than that of the incident light Li upon being excited by the incident light Li. For example, the second quantum dots 152 absorb blue light and may emit green light having a wavelength longer than that of the blue light. The first and second photosensitive polymers 141 and 151 may each be a light-transmitting organic material such as, e.g., a silicon resin and/or an epoxy resin.

The wavelengths of light emitted by the first and second quantum dots 142 and 152 may be controlled by changing their sizes or compositions. A size (e.g., length or diameter) of the first quantum dots 142 may be different from that of the second quantum dots 152. When a wavelength of emitted light increases, sizes of quantum dots for sufficiently inducing surface plasmon resonance tend to increase (e.g., longer wavelengths of emitted light are correlated with larger quantum dots, and shorter wavelengths are correlated with smaller quantum dots). Accordingly, when a wavelength of the second color light Lg is shorter than that of the first color light Lr, the second quantum dots 152 may be smaller than the first quantum dots 142.

The first and second quantum dots 142 and 152 may include a II-VI group semiconductor-based compound, a III-V group semiconductor-based compound, a IV-VI group semiconductor-based compound, a IV group semiconductor-based compound, or a combination thereof. The first and second quantum dots 142 and 152 may include the same material.

The II-VI group semiconductor-based compound may be at least one of a binary compound selected from a group consisting of CdSe, CdTe, ZnS, ZnSe, ZnTe, ZnO, HgS, HgSe, HgTe, MgSe, MgS, and a mixture thereof; a ternary compound selected from a group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary compound selected from a group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

The III-V group semiconductor-based compound may be at least one of a binary compound selected from a group consisting of GaN, GaP, GaAs, GaSb, AlN, AlP, AlAs, AlSb, InN, InP, InAs, InSb, and a mixture thereof; a ternary compound selected from a group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a quaternary compound selected from a group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof.

The IV-VI group semiconductor-based compound may be at least one of a binary compound selected from a group consisting of SnS, SnSe, SnTe, PbS, PbSe, PbTe, and a mixture thereof; a ternary compound selected from a group consisting of SnSeS, SnSeTe, SnSTe, PbSeS, PbSeTe, PbSTe, SnPbS, SnPbSe, SnPbTe, and a mixture thereof; and a quaternary compound selected from a group consisting of SnPbSSe, SnPbSeTe, SnPbSTe, and a mixture thereof.

The IV group semiconductor-based compound may be at least one of an elemental compound selected from a group consisting of Si, Ge and a mixture thereof; and a binary compound selected from a group consisting of SiC, SiGe, and a mixture thereof.

Each of the binary compound, the ternary compound, and the quaternary compound may be included in a particle at a spatially uniform concentration, or may be included at varying concentration distributions within the same particle. For example, the first and second quantum dots 142 and 152 may have a core/shell structure in which a first semiconductor nanocrystal (e.g., shell) surrounds a second semiconductor nanocrystal (e.g., core). A concentration gradient may be formed at the interface between the core and the shell. In this case, a concentration of an element in the shell decreases towards the center (e.g., inner portion) of the shell. The first and second quantum dots 142 and 152 may have a structure including a semiconductor nanocrystal core and a multi-layered shell surrounding the core. The multi-layered shell structure may have two or more layers and each layer may have a single composition, or an alloy or concentration gradient.

When the material of the shell has an energy band gap larger than the material of the core in the first and second quantum dots 142 and 152, quantum confinement effects may be efficiently exhibited. When a multi-layered shell is formed, the shell farthest from the core (e.g., the outermost shell) may have an energy band gap greater than the shell closest to the core (e.g., the innermost shell).

The first and second quantum dots 142 and 152 may have a quantum yield of about 10% or more, for example, about 30% or more, about 50% or more, about 60% or more, about 70% or more, or about 90% or more. However, embodiments of the present disclosure are not limited thereto.

The first and second quantum dots 142 and 152 may have a relatively narrow spectrum width to improve color purity or color reproducibility in a display. According to an example embodiment, the first and second quantum dots 142 and 152 may have a light emission wavelength peak having a full width at half maximum (FWHM) value of about 45 nm or less, for example, about 40 nm or less, or about 30 nm or less.

Each of the first and second quantum dots 142 and 152 may have a particle size of about 1 nm to about 100 nm (referring to a diameter of a spherical dot, or a length of the longest part of the dot if the dot is not spherical). For example, each of the first and second quantum dots 142 and 152 may have a particle size of about 1 nm to about 20 nm. When the first and second quantum dots 142 and 152 are formed of the same material, the second quantum dots 152 may be smaller than (e.g., have a smaller particle size than) the first quantum dots 142.

In some embodiments, the first and second CCLs 140 and 150 including a semiconductor nanocrystal-polymer complex may include at least one of a quantum rod and a sheet type semiconductor (e.g., a quantum plate) instead of the first and second quantum dots 142 and 152, or may further include at least one of the quantum rod and the sheet type semiconductor in addition to the first and second quantum dots 142 and 152.

In some embodiments, the first CCL 140 may include a phosphor configured to convert the incident light Li into the first color light Lr, and the second CCL 150 may include a phosphor configured to convert the incident light Li into the first color light Lg.

The retroreflective layer 130a, which is an example embodiment of the retroreflective layer 130 of FIG. 2, may include an organic material layer 131 (e.g., a base material layer) and beads 132. The terms "organic material layer" and "base material layer" may be interchangeably used herein.

The organic material layer 131 may be formed of an organic material, such as a polyimide resin, an acryl resin, and/or a resist material. The organic material layer 131 may be transparent. In some embodiments, the organic material layer 131 may include a non-transparent inorganic insulating material such as $CrO_x$ and/or $MoO_x$, and/or a non-transparent organic material such as a black resin to block the light shielding region BA from light. A refractive index of the organic material layer 131 may be lower than that of the beads 132. The organic material layer 131 may be formed of an organic material having a lower refractive index in such a manner that total reflection of light occurs at a boundary between the organic material layer 131 and the beads 132 at a large critical angle.

The beads 132 may be spherical as illustrated in FIG. 3. In some embodiments, the beads 132 may be elliptical. The beads 132 may be formed of general glass (e.g., silica glass) and/or barium titanate glass. The beads 132 formed of glass may have a refractive index of about 1.5, and the beads 132 formed of barium titanate glass may have a refractive index of about 1.9.

The retroreflective layer 130a may be formed by patterning a polymer solution including the beads 132. For example, the retroreflective layer 130a may be coated with the polymer solution and the polymer solution may then be cured. When the polymer solution is photosensitive, the retroreflective layer 130a may be formed through a photolithographic process after being coated with the photosensitive polymer solution.

A portion of the organic material layer 131 in the retroreflective layer 130a may be partially removed so that some of the beads 132 in the retroreflective layer 130a partially project from (e.g., are partially exposed at the top-facing surface of) the organic material layer 131, as illustrated in FIG. 3. For example, some of the beads 132 may be partially exposed as illustrated in FIG. 3 when etch-back etching and/or isotropic etching is performed on a structure (e.g., organic material layer) generated by curing and patterning a polymer solution including the beads 132. When the exposed area of the beads 132 is larger, the amount of light retroreflected by the retroreflective layer 130a may increase. The beads 132 may be embedded in the organic material layer 131 so that half of the surface area of the beads 132 is exposed and the remaining half of the surface area is within the organic material layer 131. Some of the beads 132 may also partially project from the organic material layer 131 (e.g., be exposed) at side surfaces of the retroreflective layer 130a (e.g., on surfaces perpendicular or at an angle to the top-facing surface).

As illustrated in FIG. 3, when the first color light Lr emitted by the first quantum dots 142 is incident on the beads 132 of the retroreflective layer 130a, the first color light Lr is reflected by the boundary between the beads 132 and the organic material layer 131 so that it travels in the opposite direction toward the first quantum dots 142. Furthermore, when the second color light Lg emitted by the second quantum dots 152 is incident on the beads 132 of the retroreflective layer 130a, the second color light Lg is reflected by the boundary between the beads 132 and the organic material layer 131 so that it travels in the opposite direction toward the second quantum dots 152. If the beads 132 are completely or substantially spherical, the first and second color lights Lr and Lg incident on the retroreflective layer 130a are reflected back to the first and second quantum dots 142 and 152 from which the first and second color lights Lr and Lg are emitted.

Therefore, the first color light Lr emitted by the first quantum dots 142 is reflected by the retroreflective layer 130a and becomes incident on the first CCL 140 again. The second color light Lg emitted by the second quantum dots 152 may also travel to (e.g., become incident on) the second CCL 150 after being reflected by the retroreflective layer 130a. Therefore, the color conversion efficiencies and light efficiencies of the first and second CCLs 140 and 150 may increase.

In addition, the retroreflective layer 130a may prevent or reduce the first color light Lr from being incident on the second CCL 150, and/or prevent or reduce the second color light Lg from being incident on the first CCL 140 because retroreflection differs from general reflection, for example, with respect to the angle of incidence and angle of reflection of incident light. Therefore, color mixing in the first and second CCLs 140 and 150 may be prevented or reduced, and thus, color reproducibility may be improved.

Although FIG. 3 illustrates that the beads 132 are spaced apart from each, embodiments of the present disclosure are not limited thereto, and the beads 132 may be concentrated as much as possible. For example, the beads 132 may directly contact each other. The beads 132 may be arranged in a honeycomb (e.g., close-packed) pattern when viewed according to a plan view.

Although FIG. 3 illustrates that the beads 132 are uniformly distributed in a section of the retroreflective layer 130a, embodiments of the present disclosure are not limited thereto, and the beads 132 may be distributed in only an upper surface of the retroreflective layer 130a. This distribution may be achieved, for example, by stacking an organic material layer including the beads 132 on top of an organic material layer formed without including the beads 132. In some embodiments, a retroreflective layer with the beads 132 distributed only in an upper surface thereof may be formed by coating a polymer solution on the retroreflective layer, removing a solvent from the polymer solution, and coating and curing the beads 132 on the retroreflective layer.

Figure 4:
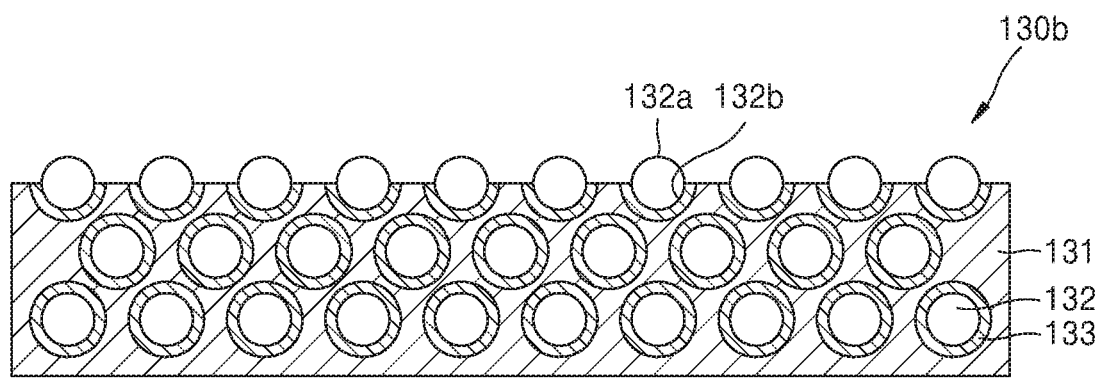
FIG. 4 is a cross-sectional view of a retroreflective layer of a color substrate according to an example embodiment of the present disclosure.

FIG. 4 is a cross-sectional view of a retroreflective layer of a color substrate according to an example embodiment of the present disclosure.

Referring to FIG. 4, a retroreflective layer 130b includes the organic material layer 131, the beads 132, and a reflective layer 133.

The organic material layer 131 may be formed of an organic material, such as a polyimide resin, an acryl resin, and/or a resist material. In some embodiments, the organic material layer 131 may include a non-transparent inorganic insulating material such as $CrO_x$ and/or $MoO_x$, and/or a non-transparent organic material such as a black resin to block the light shielding region BA from light. In some embodiments, the organic material layer 131 may be transparent.

The beads 132 may be spherical and/or elliptical as illustrated in FIG. 4 and may be formed of a transparent material. Some of the beads 132 may partially project from (e.g., may be partially exposed at the top-facing surface of) the organic material layer 131. Some of the beads 132 may include a first portion 132a exposed and projecting from the organic material layer 131 and a second portion 132b embedded in the organic material layer 131. The surface area of the first portion 132a may be substantially equal to that of the second portion 132b. The beads 132 that partially project from the organic material layer 131 may be referred to herein as "first beads", such that the first beads are disposed in an upper portion of the organic (base) material layer and include a first portion 132a exposed from (e.g., projecting from a top surface of) the organic material layer and a second portion 132b embedded in the organic material layer. The beads 132 that do not project from the organic material layer 131 may be referred to herein as "second beads", such that the second beads are embedded in the organic (base) material layer, and the organic material layer surrounds the entire surface of the second beads.

In some embodiments, the beads (e.g., the first beads) may further comprise a reflective layer. The reflective layer 133 may be positioned between the beads 132 and the organic material layer 131, and may surround the second portion 132b of the beads 132. For example, the reflective layer may surround the second portion of the first beads, and expose the first portion of the first beads. The reflective layer 133 may retroreflect light incident on the beads 132. The reflective layer 133 may be formed of a metal material having a high reflection characteristic (e.g., a highly reflective metal material), for example, silver (Ag).

The beads 132 coated with the reflective layer 133 may be prepared to form the retroreflective layer 130b. For example, the beads 132 coated with the reflective layer 133 may be dispersed in a polymer solution. The polymer solution including the beads 132 coated with the reflective layer 133 may be coated on the substrate 110, patterned, and cured to thereby form the organic material layer 131 including the beads 132 coated with the reflective layer 133. Most of the beads 132 may be embedded in the organic material layer 131. Some of the beads 132 may project from the organic material layer 131, for example, when the upper surface of the retroreflective layer 130a is partially removed. For example, some of the beads 132 in an upper portion of the retroreflective layer 130a may be partially exposed when etch-back etching or isotropic etching is performed on the organic material layer 131 in an upper surface of the retroreflective layer 130a. As another example, some of the beads (e.g., first beads) may project (e.g., be exposed) from top and side surfaces of the organic material layer 131 in an upper surface of the retroreflective layer 130a. The reflective layer 133 surrounding the projecting portion of the projected beads 132 may be removed at the same time (e.g., simultaneously), or wet etching may be further performed to remove the reflective layer 133.

When light is incident on the beads 132 of the retroreflective layer 130a, the light may be reflected by the reflective layer 133 surrounding the second portion 132b of the beads 132 to thereby travel in the direction of the light source from which the light was emitted.

The beads 132 may be concentrated as much as possible (e.g., packed as closely as possible), and/or may be distributed in only an upper portion of the retroreflective layer 130b.

Figure 5A:
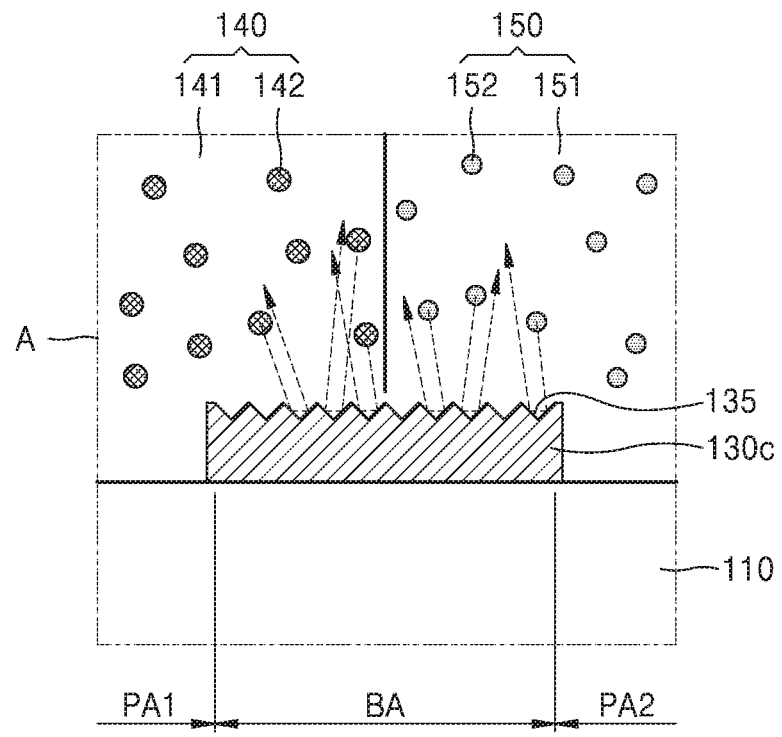
FIG. 5A is an enlarged cross-sectional view of a part of a color substrate according to an example embodiment of the present disclosure.
Figure 5B:
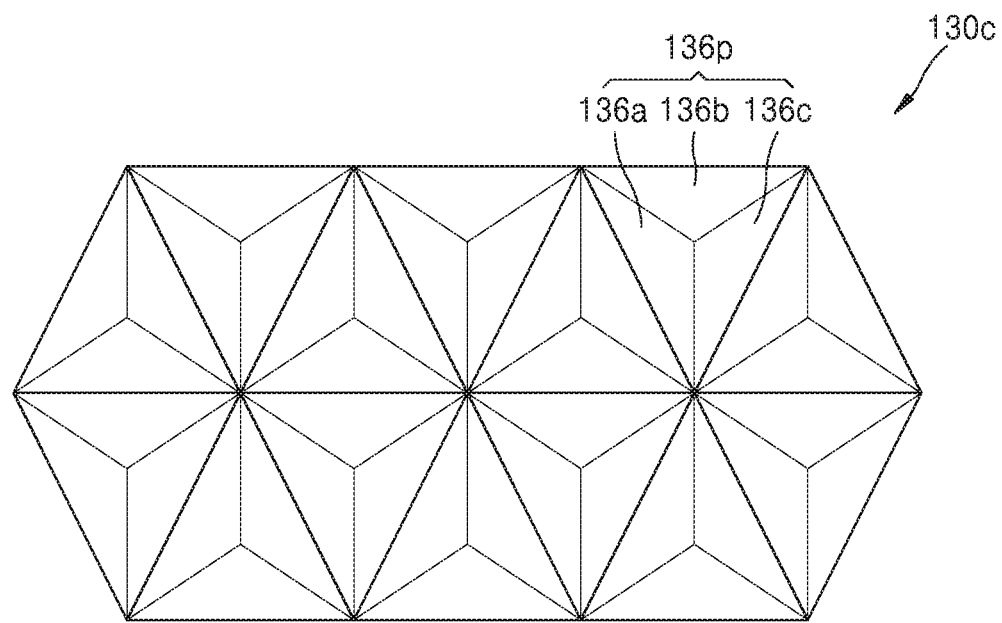
FIG. 5B is a plan view of a part of the retroreflective layer of FIG. 5A according to an example embodiment of the present disclosure.

FIG. 5A is an enlarged cross-sectional view of part of a color substrate according to an example embodiment of the present disclosure. FIG. 5A corresponds to area A of FIG. 2. FIG. 5B is a plan view of the retroreflective layer 130c of FIG. 5A.

FIG. 5A illustrates first and second CCLs 140 and 150 respectively positioned over the first and second pixel regions PA1 and PA2 as well as the light shielding region BA, and a retroreflective layer 130c positioned over the light shielding region BA of the substrate 110. The first CCL 140 includes the first photosensitive polymer 141 in which the first quantum dots 142 are dispersed. The second CCL 150 includes the second photosensitive polymer 151 in which the second quantum dots 152 are dispersed. The first CCL 140 and the second CCL 150 may be the same as described herein with reference to FIG. 3.

The retroreflective layer 130c may be formed of an organic material having a retroreflective surface 135 forming concave patterns. The concave patterns may be formed by pressing a stamp having convex patterns on an organic material layer. The concave patterns may have two or more planes positioned orthogonally to each other. The planes forming concave patterns may retroreflect incident light (e.g., in a direction opposite the incident direction).

In order for the planes forming concave patterns to retroreflect light, the refractive index of the material surrounding the retroreflective surface 135 of the retroreflective layer 130b (e.g., the first and second photosensitive polymers 141 and 151) may be higher than the refractive index of the organic material forming the retroreflective layer 130b.

The concave patterns may include a corner cube pattern 136p as illustrated in FIG. 5B. The corner cube pattern 136p is a concave pattern corresponding to a corner of a rectangular parallelepiped. The corner cube pattern 136p has three reflective surfaces 136a, 136b, and 136c positioned orthogonally to each other. Light incident on the three reflective surfaces 136a, 136b, and 136c is reflected in a direction opposite an incident direction. In some embodiments, the three reflective surfaces 136a, 136b, and 136c may not be orthogonal to each other.

In some embodiments, the concave patterns may have two reflective surfaces positioned orthogonally to each other and extending in the same direction. In this case, a section of the retroreflective surface 135 may have an uneven shape, for example, a saw-tooth shape.

In some embodiments, the retroreflective surface 135 may have a wave shape. In some embodiments, amorphous concave shapes may be formed in the retroreflective surface 135.

Figure 6A:
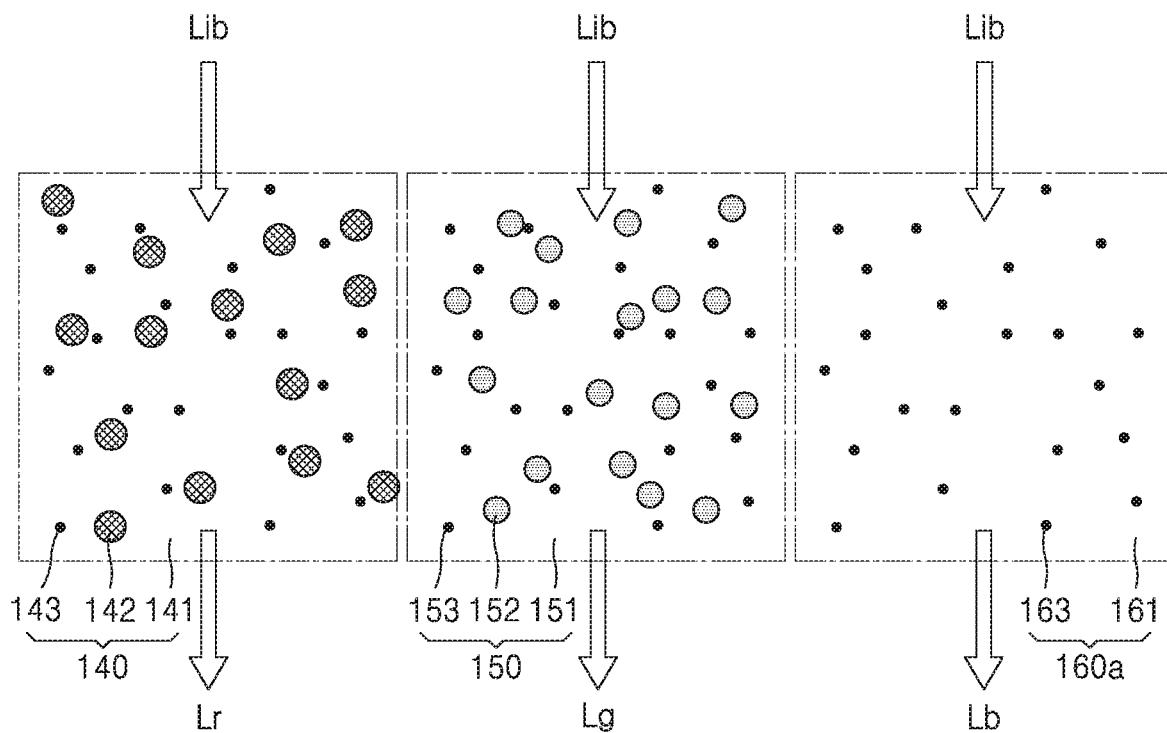
FIG. 6A is an enlarged cross-sectional view of first and second color conversion layers (CCLs) of a color substrate and a light-emitting layer according to an example embodiment of the present disclosure.

FIG. 6A is an enlarged cross-sectional view of the first and second CCLs 140 and 150 of a color substrate and a light-emitting layer according to an example embodiment of the present disclosure.

Referring to FIG. 6A, the first CCL 140 converts blue incident light Lib into the first color light Lr. The first CCL 140 may include the first photosensitive polymer 141 in which the first quantum dots 142 and first scattered particles 143 are dispersed.

The first quantum dots 142 may isotropically emit the first color light Lr having a wavelength longer than blue light upon being excited by the blue incident light Lib. The first photosensitive polymer 141 may be a light-transmitting organic material. The first scattered particles 143 may scatter a portion of the blue incident light Lib that is not initially absorbed by the first quantum dots 142 so that more of the first quantum dots 142 are excited. Therefore, the color conversion efficiency of the first CCL 140 may be increased. The first scattered particles 143 may be, e.g., titanium oxide ($TiO_2$), metal particles, and/or the like. The first quantum dots 142 may include a II-VI group semiconductor-based compound, a III-V group semiconductor-based compound, a IV-VI group semiconductor-based compound, a IV group semiconductor-based compound, or a combination thereof.

The second CCL 150 converts the blue incident light Lib into the second color light Lg. The second CCL 150 may include the second photosensitive polymer 151, in which the second quantum dots 152 and the second scattered particles 153 are dispersed.

The second quantum dots 152 may isotropically emit the second color light Lg having a wavelength longer than blue light upon being excited by the blue incident light Lib. The second photosensitive polymer 151, which is a light-transmitting organic material, may include the same material as the first photosensitive polymer 141. The second scattered particles 153 may scatter a portion of the blue incident light Lib that is not initially absorbed by the second quantum dots 152 so that more of the second quantum dots 152 are excited. Therefore, the color conversion efficiency of the second CCL 150 may be increased. The second scattered particles 153 may be, e.g., $TiO_2$, metal particles, and/or the like, and may include the same material as that of the first scattered particles 143. The second quantum dots 152 may include a II-VI group semiconductor-based compound, a III-V group semiconductor-based compound, a IV-VI group semiconductor-based compound, a IV group semiconductor-based compound, or a combination thereof. The first and second quantum dots 142 and 152 may be formed of the same material. In this case, the sizes of the second quantum dots 152 may be smaller than the sizes of the first quantum dots 142.

A light-transmitting layer 160a, which is an example embodiment of the light-emitting layer 160 of FIG. 2, may transmit the blue incident light Lib and/or emit the blue incident light Lib in the direction of the substrate 110. The light-transmitting layer 160a may include a third photosensitive polymer 161 in which third scattered particles 163 are dispersed. The third photosensitive polymer 161, which is a light-transmitting organic material such as a silicon resin and/or an epoxy resin, may include the same material as the first and second photosensitive polymers 141 and 151. The third scattered particles 163 may scatter and emit the blue incident light Lib, and may include the same material as the first and second scattered particles 143 and 153.

Figure 6B:
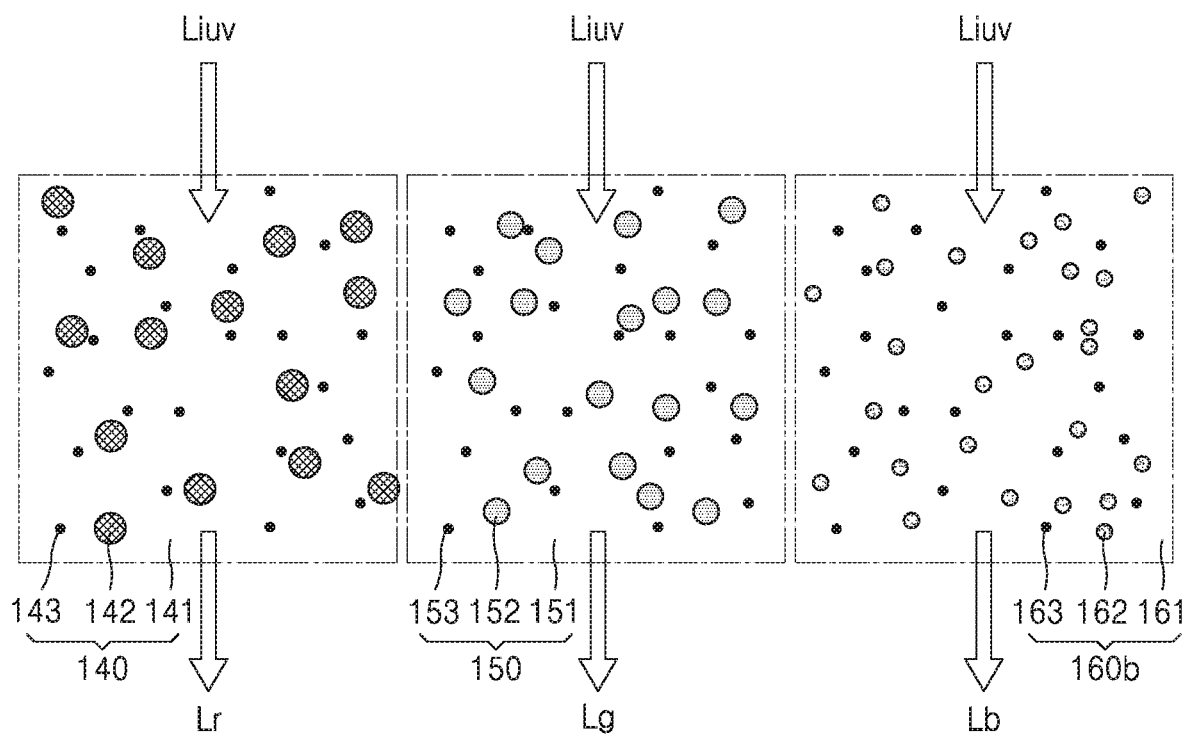
FIG. 6B is an enlarged cross-sectional view of first and second CCLs of a color substrate and a light-emitting layer according to an example embodiment of the present disclosure.

FIG. 6B is an enlarged cross-sectional view of the first and second CCLs 140 and 150 of a color substrate and a light-emitting layer according to an example embodiment of the present disclosure.

Referring to FIG. 6B, the first CCL 140 converts UV incident light Liuv into the first color light Lr. The first CCL 140 may include the first photosensitive polymer 141 in which the first quantum dots 142 and the first scattered particles 143 are dispersed. The first quantum dots 142 may isotropically emit the first color light Lr having a wavelength longer than that of UV light upon being excited by the UV incident light Liuv.

The second CCL 150 converts the UV incident light Liuv into the second color light Lg. The second CCL 150 may include the second photosensitive polymer 151 in which the second quantum dots 152 and the second scattered particles 153 are dispersed. The second quantum dots 152 may isotropically emit the second color light Lg having a wavelength longer than that of UV light upon being excited by the UV incident light Liuv.

A third CCL 160b, which is another example embodiment of the light-emitting layer 160 of FIG. 2, converts the UV incident light Liuv into the third color light Lb. The third CCL 160b may include the third photosensitive polymer 161 in which third quantum dots 162 and the third scattered particles 163 are dispersed. The third quantum dots 162 may isotropically emit the third color light Lb having a wavelength longer than that of UV light upon being excited by the UV incident light Liuv. The third photosensitive polymer 161, which is a light-transmitting organic material, may include the same material as the first and second photosensitive polymers 141 and 151. The third scattered particles 163 may scatter the portion of UV incident light Liuv that is not initially absorbed by the third quantum dots 162 so that more of the third quantum dots 162 are excited. Therefore, the color conversion efficiency of the third CCL 160b may be increased. The third scattered particles 163 may be, e.g., $TiO_2$, metal particles and/or the like, and may include the same material as the first and second scattered particles 143 and 153. The third quantum dots 162 may include a II-VI group semiconductor-based compound, a III-V group semiconductor-based compound, a IV-VI group semiconductor-based compound, a IV group semiconductor-based compound, or a combination thereof. The first through third quantum dots 142, 152, and 162 may be formed of the same material. In this case, the sizes of the third quantum dots 162 may be smaller than the sizes of the second quantum dots 152.

Figure 7:
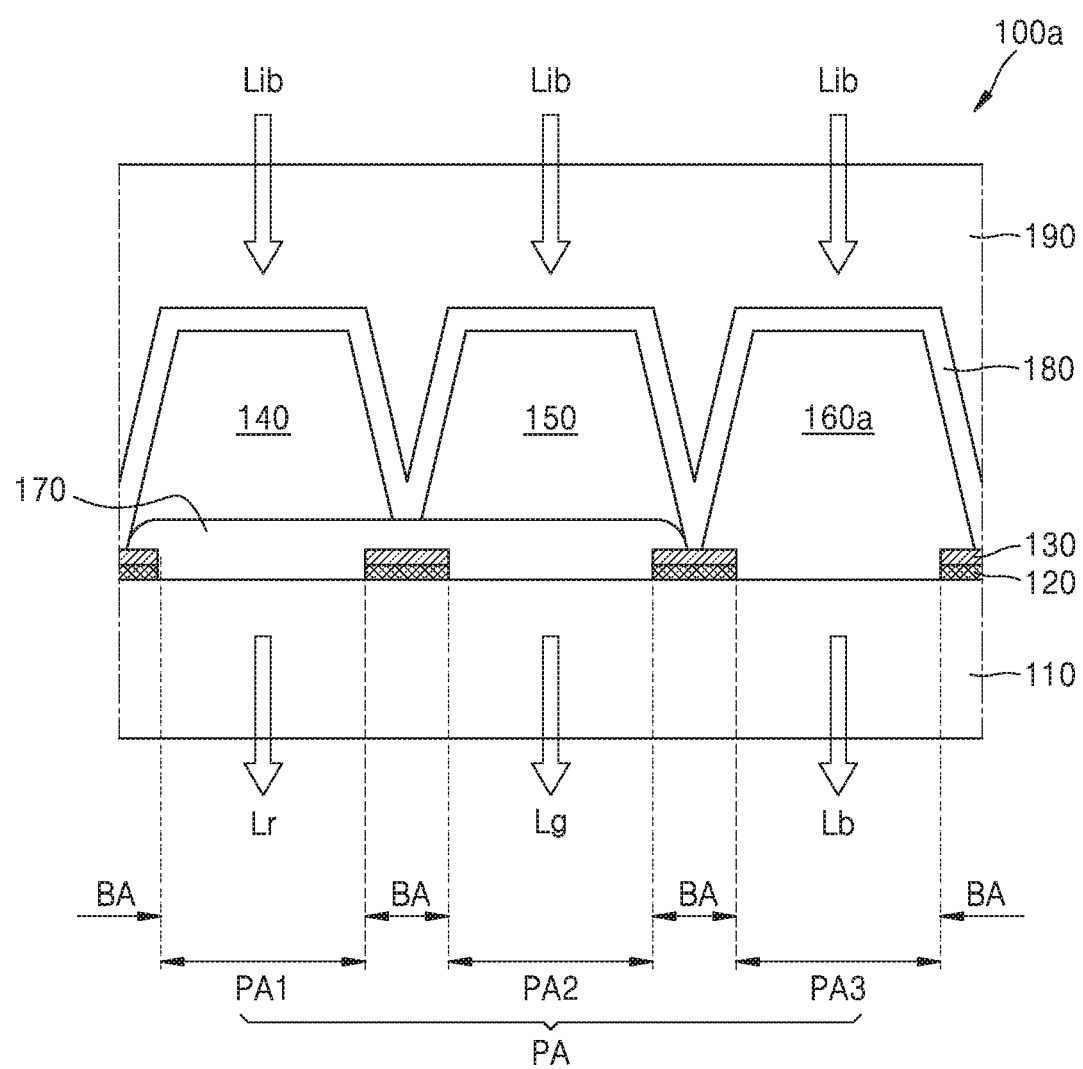
FIG. 7 is a cross-sectional view of a color substrate according to an example embodiment of the present disclosure.

FIG. 7 is a cross-sectional view of a color substrate according to an example embodiment of the present disclosure.

Referring to FIG. 7, a color substrate 100a includes the substrate 110, a light shielding layer 120, the retroreflective layer 130, the first and second CCLs 140 and 150, the light-transmitting layer 160a, a first color filter layer 170, a second color filter layer 180, and the planarization layer 190.

The blue incident light Lib may be incident on the color substrate 100a, and the first through third color lights Lr, Lg, and Lb may be emitted through the first and second CCLs 140 and 150 and the light-transmitting layer 160a, respectively. The first and second CCLs 140 and 150 and the light-transmitting layer 160a may be the same as described herein with reference to FIG. 6A.

The substrate 110 is a transparent substrate configured to transmit the first through third color lights Lr, Lg, and Lb. The pixel region PA configured to emit light and the light shielding region BA not emitting light are defined in the substrate 110. The pixel region PA may be divided into the first pixel region PA1 configured to emit the first color light Lr, the second pixel region PA2 configured to emit the second color light Lg, and the third pixel region PA3 configured to emit the third color light Lb. The pixel regions PA1, PA2, and PA3 are each surrounded by portions of the light shielding region BA.

The light shielding layer 120 may be positioned over the light shielding region BA. The light shielding layer 120 may be formed over the light shielding region BA as a thin film. The light shielding layer 120 may prevent or reduce leakage of light from the light shielding region BA.

The light shielding layer 120 may have various colors, including black and/or white. When the light shielding layer 120 is black, the light shielding layer 120 may include a black matrix. When the light shielding layer 120 is white, the light shielding layer 120 may include an organic insulating material such as a white resin. The light shielding layer 120 may include a non-transparent inorganic insulating material such as $CrO_x$ and/or $MoO_x$, or a non-transparent organic material such as a black resin. When the retroreflective layer 130 has light shielding characteristics, the light shielding layer 120 may be omitted.

The retroreflective layer 130 is positioned over the light shielding layer 120 and retroreflects incident light through the first and second CCLs 140 and 150 and the light-transmitting layer 160a. The retroreflective layer 130 may be the same as described herein with reference to FIGS. 3, 4, 5A and 5B.

The first color filter layer 170, which is positioned in the first and second pixel regions PA1 and PA2, reflects the blue incident light Lib to the first and second CCLs 140 and 150 so that the blue incident light Lib is not emitted to the substrate 110. More of the first and second quantum dots 142 and 152 in the first and second CCLs 140 and 150 may be excited when the blue incident light Lib is reflected, and the color conversion efficiencies of the first and second CCLs 140 and 150 may be increased. Furthermore, color reproducibility may be improved since the blue incident light Lib is prevented or reduced from being emitted through the first and second pixel regions PA1 and PA2.

The first color filter layer 170 may be a blue light reflecting filter that reflects the blue incident light Lib, or may be a blue light blocking filter that absorbs the blue incident light Lib. The first color filter layer 170 transmits the first and second color lights Lr and Lg.

Although FIG. 7 illustrates an embodiment in which the first color filter layer 170 is continuous over the first and second pixel regions PA1 and PA2, in some embodiments, the first color filter layer 170 may be individually positioned over each of the first and second pixel regions PA1 and PA2 (e.g., in segments). The first color filter layer 170 positioned over the first pixel region PA1 may be a red light transmission filter configured to selectively transmit the first color light Lr. The red light transmission filter may reflect the blue incident light Lib and the second and third color lights Lg and Lb. The first color filter layer 170 positioned in the second pixel region PA2 may be a green light transmission filter configured to selectively transmit the second color light Lg. The green light transmission filter may reflect the blue incident light Lib and the first and third color lights Lr and Lb.

The second color filter layer 180, which is positioned over the first and second CCLs 140 and 150 and the light-transmitting layer 160a, may selectively transmit the third color light Lb included in the blue incident light Lib and reflect the first and second color lights Lr and Lg emitted by the first and second CCLs 140 and 150, and may thus emit the first and second color lights Lr and Lg in the direction of the substrate 110. Since the second color filter layer 180 reflects the first and second color lights Lr and Lg traveling away from the substrate 110 and thereby emits the first and second color lights Lr and Lg toward a direction of the substrate 110, the light efficiency of the substrate may be improved.

The second color filter layer 180 may cover side surfaces and upper surfaces of the first and second CCLs 140 and 150 and the light-transmitting layer 160a. In some embodiments, the second color filter layer 180 may also provide a flat surface when it is thickly stacked on the first and second CCLs 140 and 150 and the light-transmitting layer 160a. In this case, the planarization layer 190 may be omitted.

When the blue incident light Lib includes red light and/or green light, the green light may be transmitted outside through the first pixel region PA1 without exciting the first quantum dots 142 in the first CCL 140, and the red light may be transmitted outside through the second pixel region PA2 without exciting the second quantum dots 152 in the second CCL 150. Color purity and color reproducibility may deteriorate when green light as well as the first color light Lr are emitted through the first pixel region PA1, and red light as well as the second color light Lg are emitted through the second pixel region PA2. Color purity and color reproducibility may be improved when the second color filter layer 180 selectively transmits only the blue light Lb. For example, the second color filter layer 180 may be formed by alternately (e.g., alternatingly) laminating at least two layers having different refractive indexes.

The planarization layer 190 may be positioned over the second color filter layer 180 to provide a flat surface. In some embodiments, the planarization layer 190 may be positioned over the first and second CCLs 140 and 150 and the light-transmitting layer 160a, or the second color filter layer 180 may be positioned over the planarization layer 190.

Figure 8:
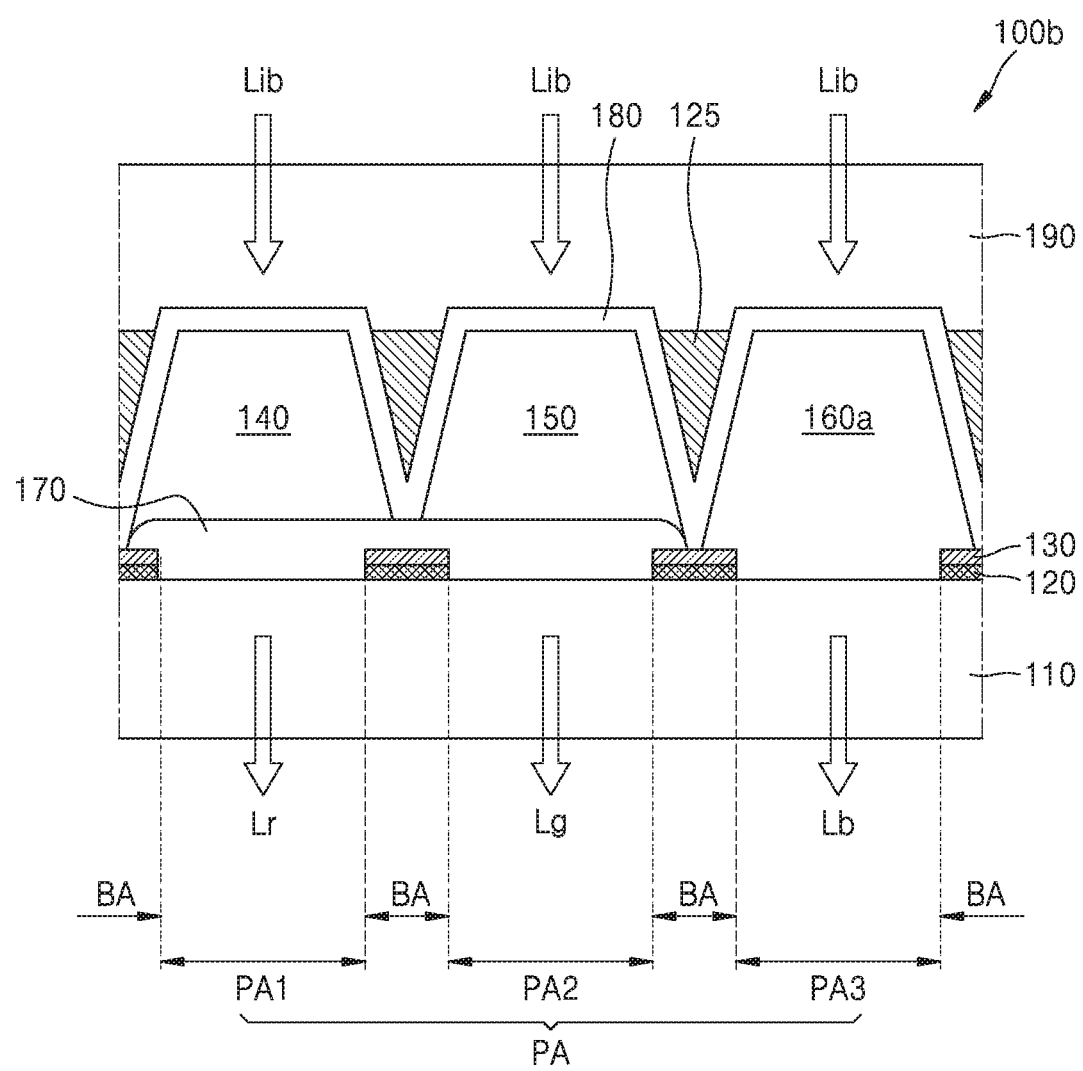
FIG. 8 is a cross-sectional view of a color substrate according to an example embodiment of the present disclosure.

FIG. 8 is a cross-sectional view of a color substrate according to an example embodiment of the present disclosure.

Referring to FIG. 8, a color substrate 100b includes the substrate 110, the light shielding layer 120, the retroreflective layer 130, the first and second CCLs 140 and 150, the light-transmitting layer 160a, the first color filter layer 170, the second color filter layer 180, a light shielding sidewall 125, and the planarization layer 190.

The substrate 110, the light shielding layer 120, the retroreflective layer 130, the first and second CCLs 140 and 150, the light-transmitting layer 160a, the first and second color filter layers 170 and 180, blue incident light Lib, first through third pixel regions PA1 through PA3, and the planarization layer 190 may be similar to those described herein with reference to FIG. 7, and the differences will be described in more detail below.

The light shielding sidewall 125 is positioned over a portion of the second color filter layer 180 to surround at least some of the side surfaces of the first and second CCLs 140 and 150 and the light-transmitting layer 160a. The light shielding sidewall 125 may be positioned over the light shielding layer 120 in areas corresponding to the light shielding region BA. The light shielding sidewall 125 may appear to be formed in a mesh shape or pattern when the light shielding layer 120 is viewed in a plan view.

The light shielding sidewall 125 may be formed of an organic material configured to block or reflect the first through third color lights Lr, Lg, and Lb emitted by the first and second CCLs 140 and 150 and the light-transmitting layer 160a, respectively.

The light shielding sidewall 125 may prevent or reduce first color light Lr emitted from a side surface of the first CCL 140 from being incident on the second CCL 150 and the light-transmitting layer 160a. The light shielding sidewall 125 may prevent or reduce second color light Lg emitted from a side surface of the second CCL 150 from being incident on the first CCL 140 and the light-transmitting layer 160a. The light shielding sidewall 125 may prevent or reduce third color light Lb scattered in the light-transmitting layer 160a and emitted from a side surface of the light-transmitting layer 160a from being incident on the first and second CCLs 140 and 150. Therefore, color purity and color reproducibility may be improved since color mixing is prevented or reduced by the light shielding sidewall 125.

Figure 9:
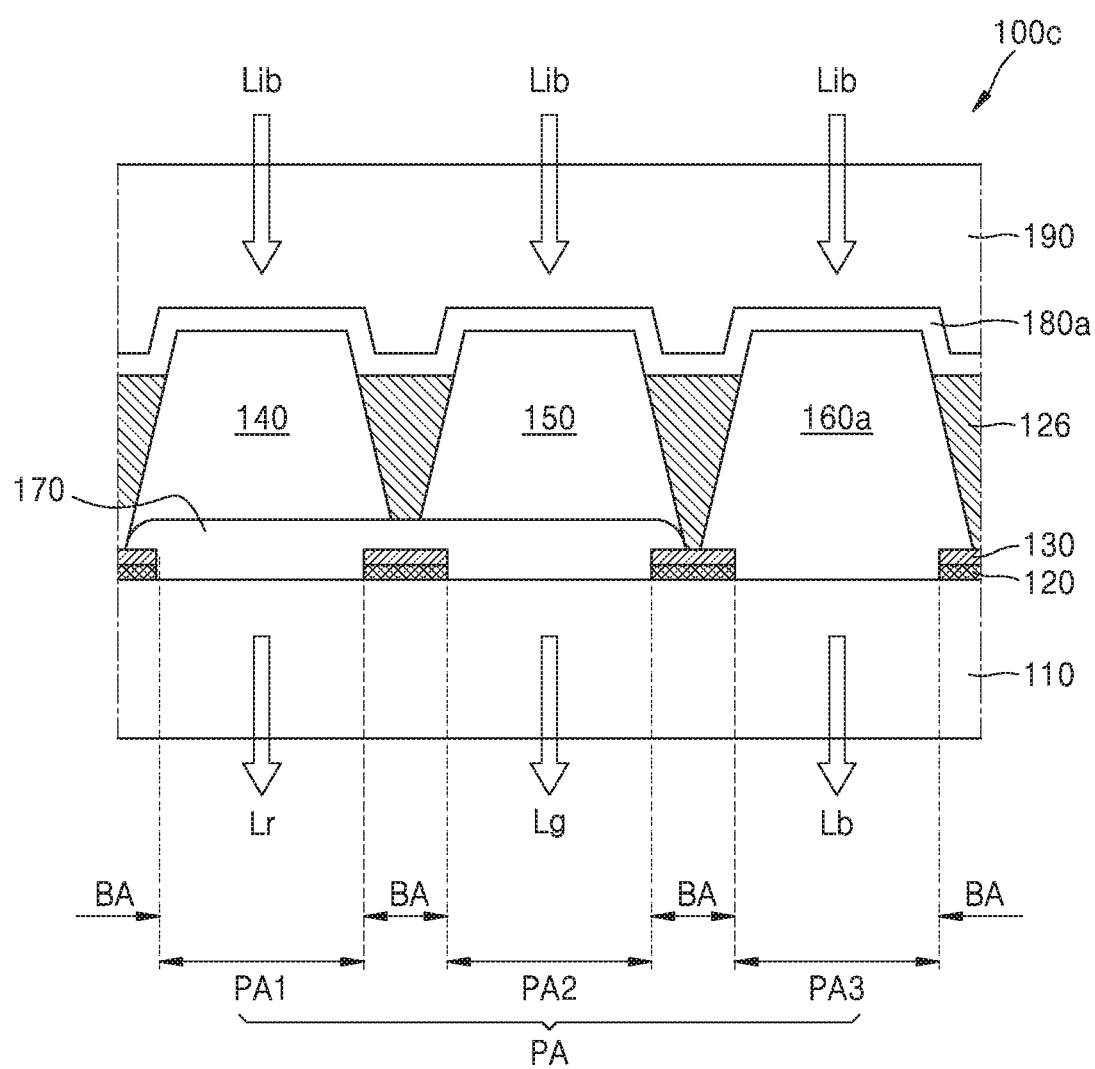
FIG. 9 is a cross-sectional view of a color substrate according to an example embodiment of the present disclosure.

FIG. 9 is a cross-sectional view of a color substrate according to an example embodiment of the present disclosure.

Referring to FIG. 9, a color substrate 100c includes the substrate 110, the light shielding layer 120, the retroreflective layer 130, the first and second CCLs 140 and 150, the light-transmitting layer 160a, the first color filter layer 170, a second color filter layer 180a, a light shielding sidewall 126, and the planarization layer 190.

The substrate 110, the light shielding layer 120, the retroreflective layer 130, the first and second CCLs 140 and 150, the light-transmitting layer 160a, the first color filter layer 170, the blue incident light Lib, the light shielding region BA, the first through third pixel regions PA1 through PA3, and the planarization layer 190 may be similar to those described positioned herein with reference to FIG. 7, and the differences will be described in more detail below.

A light shielding sidewall 126 may surround at least a portion of the side surfaces of the first and second CCLs 140 and 150 and the light-transmitting layer 160a. The light shielding sidewall 126 may be positioned over the light shielding layer 120. The light shielding sidewall 126 may appear to be formed in a mesh shape or pattern when the light shielding layer 120 is viewed in a plan view.

The light shielding sidewall 126 may be formed of an organic material configured to block or reflect the first through third color lights Lr, Lg, and Lb emitted by the first and second CCLs 140 and 150 and the light-transmitting layer 160a, respectively. Color purity and color reproducibility may be improved since color mixing is prevented or reduced by the light shielding sidewall 126.

The second color filter layer 180a, which is positioned over the first and second CCLs 140 and 150 and the light-transmitting layer 160a, may selectively transmit the blue incident light Lib, thereby improving color purity and color reproducibility. Light efficiency may be improved when the second color filter layer 180a reflects the first and second color lights Lr and Lg emitted by the first and second CCLs 140 and 150.

Figure 10:
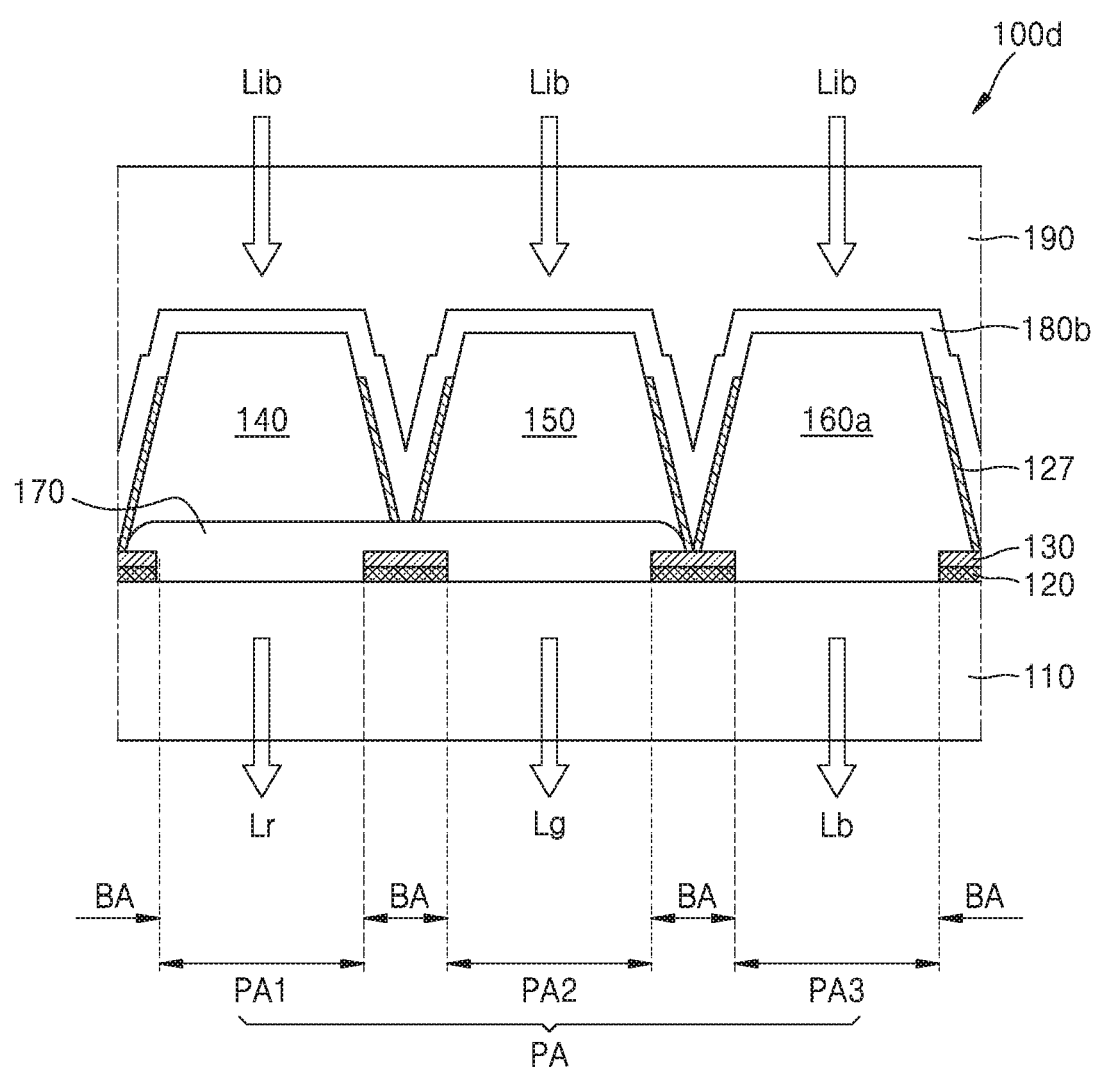
FIG. 10 is a cross-sectional view of a color substrate according to an example embodiment of the present disclosure.

FIG. 10 is a cross-sectional view of a color substrate according to an example embodiment of the present disclosure.

Referring to FIG. 10, a color substrate 100d includes the substrate 110, the light shielding layer 120, the retroreflective layer 130, the first and second CCLs 140 and 150, the light-transmitting layer 160a, the first color filter layer 170, a second color filter layer 180b, the light shielding sidewall 127, and the planarization layer 190.

The substrate 110, the light shielding layer 120, the retroreflective layer 130, the first and second CCLs 140 and 150, the light-transmitting layer 160a, the first color filter layer 170, the blue incident light Lib, the light shielding region BA, the first through third pixel regions PA1 through PA3, and the planarization layer 190 may be similar to those described herein with reference to FIG. 7, and the differences will be described in more detail below.

The light shielding sidewall 127 may surround at least a portion of the side surfaces of the first and second CCLs 140 and 150 and the light-transmitting layer 160a. The light shielding sidewall 127 may be positioned over the light shielding layer 120. The light shielding sidewall 127 may appear to be formed in a mesh shape or pattern when the light shielding layer 120 is viewed in a plan view.

The light shielding sidewall 127 may be formed of metal, and may be configured to block or reflect the first through third color lights Lr, Lg, and Lb emitted from the first and second CCLs 140 and 150 and the light-transmitting layer 160a. For example, the light shielding sidewall 127 may be formed of silver. Color purity and color reproducibility may be improved since color mixing is prevented or reduced by the light shielding sidewall 127, and light efficiency may be improved since the light shielding sidewall 127 reflects the first through third color lights Lr, Lg, and Lb traveling in a side direction.

The second color filter layer 180b is positioned over the first and second CCLs 140 and 150, the light-transmitting layer 160a, and the light shielding sidewall 127, and may selectively transmit the blue incident light Lib, thereby improving color purity and color reproducibility. Light efficiency may be improved since the second color filter layer 180b reflects the first and second color lights Lr and Lg emitted by the first and second CCLs 140 and 150.

Figure 11:
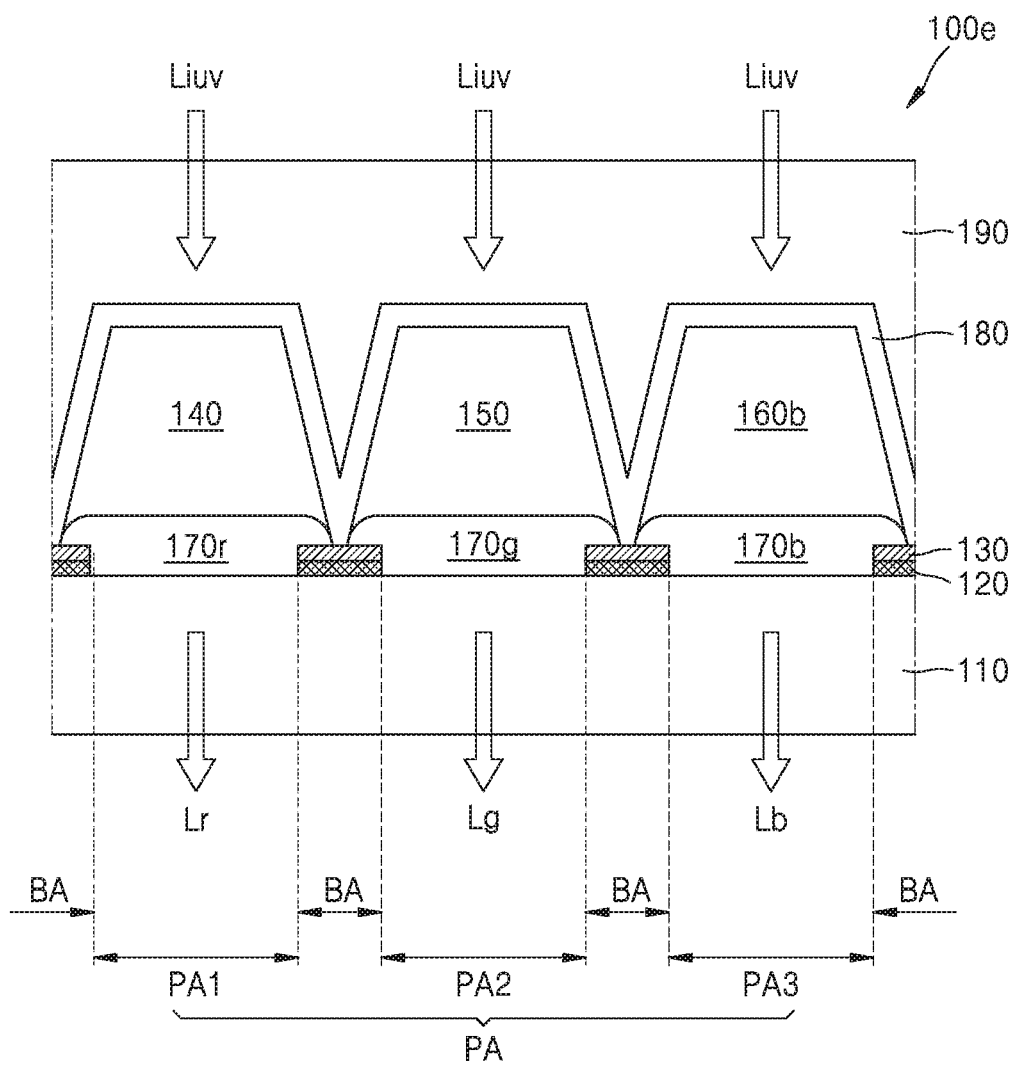
FIG. 11 is a cross-sectional view of a color substrate according to an example embodiment of the present disclosure.

FIG. 11 is a cross-sectional view of a color substrate according to an example embodiment of the present disclosure.

Referring to FIG. 11, a color substrate 100e includes the substrate 110, the light shielding layer 120, the retroreflective layer 130, the first and second CCLs 140 and 150, the third CCL 160b, first through third sub color filter layers 170r, 170g, and 170b, the second color filter layer 180, and the planarization layer 190.

The UV incident light Liuv may be incident on the color substrate 100e, and each of the first through third CCLs 140, 150, and 160b may convert the UV incident light Liuv to the first through third color lights Lr, Lg, and Lb and may emit the first through third color lights Lr, Lg, and Lb. The first through third CCLs 140, 150 and 160b and the light shielding region BA may be the same as described herein with reference to FIG. 6B.

The substrate 110, the light shielding layer 120, the retroreflective layer 130, the second color filter layer 180, and the planarization layer 190 may be similar to those described herein with reference to FIG. 7, and the differences will be described in more detail below. The color substrate 100e may include at least one of the light shielding sidewalls 125, 126, and 127 of FIGS. 8 to 10.

The first through third sub color filter layers 170r, 170g, and 170b are positioned over the first through third pixel regions PA1 through PA3, respectively. The first through third sub color filter layers 170r, 170g, and 170b respectively reflect the UV incident light Liuv to the first through third CCLs 140, 150 and 160b in such a manner that the UV incident light Liuv is not emitted to the substrate 110. A larger amount or proportion of the first through third quantum dots 142, 152, and 162 in the first through third CCLs 140, 150, and 160b may be excited when the UV incident light Liuv passing through the first through third CCLs 140, 150 and 160b is reflected by the first through third sub color filter layers 170r, 170g, and 170b. The color conversion efficiency of the UV incident light Liuv may be improved, and the UV incident light harmful to human body may be prevented or reduced from being transmitted outside. The first through third sub color filter layers 170r, 170g, and 170b may be UV light reflecting filter(s) and/or UV light blocking filter(s).

The first sub color filter layer 170r positioned over the first pixel region PA1 may be a red light transmission filter configured to selectively transmit the first color light Lr. The red light transmission filter may reflect or absorb the UV incident light Liuv and the second and third color lights Lg and Lb. The second color filter layer 170g positioned over the second pixel region PA2 may be a green light transmission filter configured to selectively transmit the second color light Lg. The green light transmission filter may reflect or absorb the UV incident light Liuv and the first and third color lights Lr and Lb. The third sub color filter layer 170b positioned over the third pixel region PA3 may be a blue light transmission filter configured to selectively transmit the third color light Lb. The blue light transmission filter may reflect or absorb the UV incident light Liuv and the first and second color lights Lr and Lg.

Figure 12:
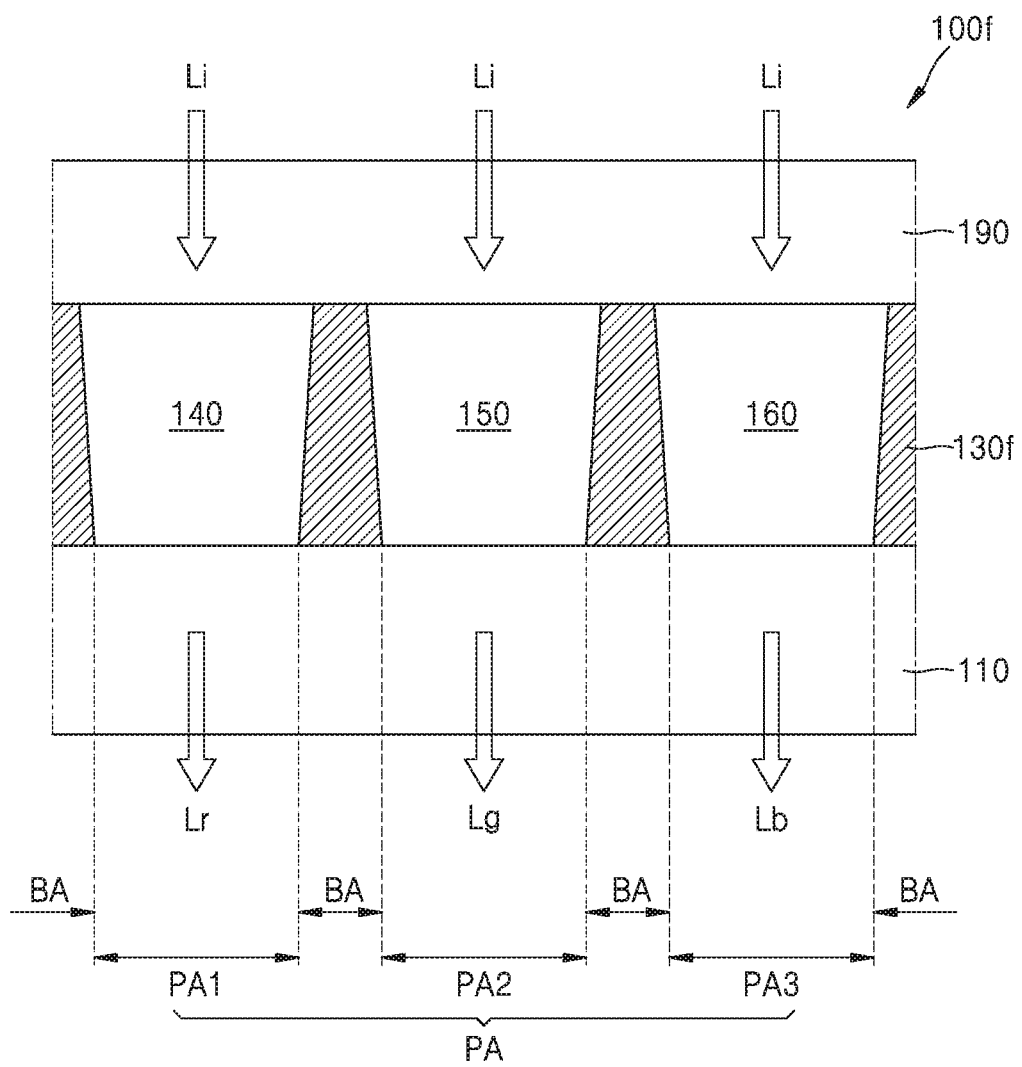
FIG. 12 is a cross-sectional view of a color substrate according to an example embodiment of the present disclosure.

FIG. 12 is a cross-sectional view of a color substrate according to an example embodiment of the present disclosure.

Referring to FIG. 12, a color substrate 100f includes the substrate 110, a retroreflective layer 130f, and the first and second CCLs 140 and 150. The substrate 110 includes the first and second pixel regions PA1 and PA2 spaced apart from each other, and the light shielding region BA positioned between the first and second pixel regions PA1 and PA2. The first CCL 140 is positioned over the first pixel region PA1 and converts the incident light Li into the first color light Lr. The second CCL 150 is positioned over the second pixel region PA2 and converts the incident light Li into the second color light Lg. The retroreflective layer 130f is positioned over the light shielding region BA and retroreflects incident light through the first and second CCLs 140 and 150.

The color substrate 100f may further include the light-emitting layer 160 positioned over the third pixel region PA3, which is spaced apart from the first and second pixel regions PA1 and PA2. The light-emitting layer 160 may interact with the incident light Li, and emit the third color light Lb. The light-emitting layer 160 may be a light-transmitting layer transmitting the incident light Li of the third color, or a third CCL converting the incident light Li into the third color light Lb. Since the color substrate 100f receives the incident light Li and emits the first through third color lights Lr, Lg, and Lb, the color substrate 100f may function as a color filter.

The color substrate 100f may further include the planarization layer 190 having a flat upper surface over the first and second CCLs 140 and 150 and the light-emitting layer 160.

The pixel region PA and the light shielding region BA are defined in the substrate 110. The pixel region PA configured to emit light is surrounded by the light shielding region BA. The pixel region PA may be divided into the first through third pixel regions PA1 through PA3 according to a color of emitted light. The light shielding region BA that does not emit light may be arranged in a mesh shape or pattern between the first through third pixel regions PA1 through PA3. The substrate 110 is a transparent substrate from which the first through third color lights Lr, Lg, and Lb are emitted through the first through third pixel regions PA1 through PA3, respectively.

The retroreflective layer 130f is positioned over the light shielding region BA and retroreflects incident light through the first and second CCLs 140 and 150. As used herein, the terms "retroreflect" and "retroreflection" indicate reflection of incident light from a light source back to that light source. Although incident light and retroreflected light are ideally parallel to each other, the terms as used in the current specification may indicate reflection of light in an approximate direction of the incident light. The retroreflective layer 130f, which is positioned between the first and second CCLs 140 and 150 and the light-emitting layer 160 when viewed from a horizontal direction of the substrate 110, may function as a barrier wall between the first and second CCLs 140 and 150 and the light-emitting layer 160. A height of an upper surface of the retroreflective layer 130f may be substantially the same as that of an upper surface of the first and second CCLs 140 and 150. The retroreflective layer 130f may be positioned over the light shielding region BA of the substrate 110, and the first and second CCLs 140 and 150 and the light-emitting layer 160 may be formed in a concave space limited by the retroreflective layer 130f utilizing an inkjet method.

The structure and components of the retroreflective layer 130f may be the same as those of the retroreflective layers 130a and 130b described above with reference to FIGS. 3 and 4. When the retroreflective layer 130f is positioned between the first and second CCLs 140 and 150, the first color light Lr emitted by the first CCL 140 cannot be irradiated onto the second CCL 150, and the second color light Lg emitted by the second CCL 150 cannot be irradiated onto the first CCL 140. Therefore, color mixing between the first and second CCLs 140 and 150 may be prevented or reduced. Furthermore, a manufacturing process may be simplified and a manufacturing time may be reduced because the first and second CCLs 140 and 150 and the light-emitting layer 160 may be formed by an inkjet coating method. The retroreflective layer 130f, which functions as a barrier wall, may prevent, block, or reduce a color converting material coated by an inkjet method from flowing to another region other than a fixed location.

The retroreflective layer 130f may have a sloped surface due to a large thickness thereof. For example, the retroreflective layer 130f may have a trapezoidal shape in which the horizontal direction width decreases with increasing distance from the substrate 110. When the first and second CCLs 140 and 150 and the light-emitting layer 160 formed in the concave space limited by the retroreflective layer 130f are formed utilizing an inkjet method, the retroreflective layer 130f may have an inverted trapezoidal shape in which the horizontal direction width increases with increasing distance from the substrate 110. The first and second CCLs 140 and 150, the light-emitting layer 160, and the planarization layer 190 may be the same as described herein with reference to FIG. 2.

Figure 13:
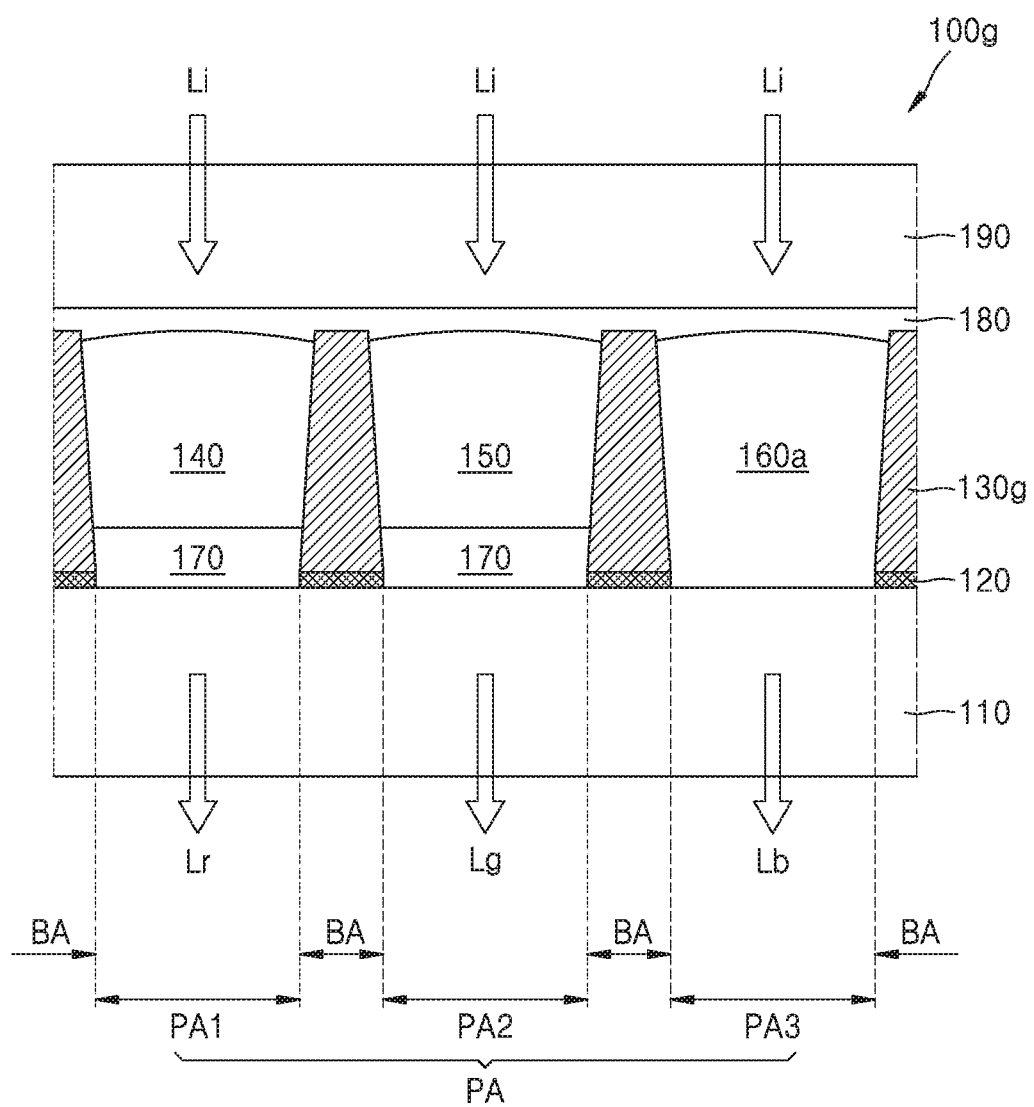
FIG. 13 is a cross-sectional view of a color substrate according to an example embodiment of the present disclosure.

FIG. 13 is a cross-sectional view of a color substrate according to an example embodiment of the present disclosure.

Referring to FIG. 13, a color substrate 100g includes the substrate 110, the light shielding layer 120, a retroreflective layer 130g, the first and second CCLs 140 and 150, the light-transmitting layer 160a, the first and second color filter layers 170 and 180, and the planarization layer 190.

The blue incident light Li may be incident on the color substrate 100g, and the first through third color lights Lr, Lg and Lb may be emitted through the first and second CCLs 140 and 150 and the light-transmitting layer 160a. The first and second CCLs 140 and 150 and the light-transmitting layer 160a may be the same as described herein with reference to FIG. 7.

The substrate 110 may be a transparent substrate configured to transmit the first through third color lights Lr, Lg, and Lb. The pixel region PA configured to emit light and the light shielding region BA not configured to emit light are defined in the substrate 110. The pixel region PA may be divided into the first through third pixel regions PA1 through PA3, from which the first through third color lights Lr, Lg, and Lb are respectively emitted. The pixel regions PA1, PA2, and PA3 are each surrounded by portions of the light shielding region BA.

The light shielding layer 120 may be positioned over the light shielding region BA. The light shielding layer 120 may be positioned over the light shielding region BA with a thin film. The light shielding layer 120 may prevent or reduce light from being leaked out from the light shielding region BA.

The retroreflective layer 130g is positioned over the light shielding layer 120 and retroreflects incident light through the first and second CCLs 140 and 150 and the light-transmitting layer 160a. The retroreflective layer 130g may be positioned over the light shielding layer 120 like a barrier wall.

The retroreflective layer 130g, which is positioned between the first and second CCLs 140 and 150 and the light-transmitting layer 160a when viewed from a horizontal direction of the substrate 110, may function as a barrier wall between the first and second CCLs 140 and 150 and the light-transmitting layer 160a. The height of an upper surface of the retroreflective layer 130g may be substantially the same as that of the upper surface of the first and second CCLs 140 and 150 and the light-transmitting layer 160a. For example, the height of an upper surface of the retroreflective layer 130g may be about 80% to about 120% of that of the upper surface of the first and second CCLs 140 and 150 and the light-transmitting layer 160a. The retroreflective layer 130g may be positioned over the light shielding region BA of the substrate 110, and the first and second CCLs 140 and 150 and the light-transmitting layer 160a may be formed in a concave space limited by the retroreflective layer 130g by an inkjet method. Components of the retroreflective layer 130g may be the same as those of the retroreflective layers 130a and 130b described above with reference to FIGS. 3 and 4.

The first color filter layer 170, which is positioned over the first and second pixel regions PA1 and PA2, reflects the blue incident light Lib to the first and second CCLs 140 and 150 such that the blue incident light Lib is not incident on the substrate 110. More of the first and second quantum dots 142 and 152 in the first and second CCLs 140 and 150 may be excited when the blue incident light Lib is reflected, and the color conversion efficiency of the first and second CCLs 140 and 150 may thereby be increased. Furthermore, color reproducibility may be improved when the blue incident light Lib is prevented or reduced from being emitted through the first and second pixel regions PA1 and PA2.

The first color filter layer 170 may be divided into a part over the first pixel region PA1 and a part over the second pixel region PA2 by the retroreflective layer 130g. The first color filter layer 170 positioned over the first pixel region PA1 may be a red light transmission filter configured to selectively transmit the first color light Lr. The red light transmission filter may reflect the blue incident light Lib and the second and third color lights Lg and Lb. The first color filter layer 170 positioned in the second pixel region PA2 may be a green light transmission filter configured to selectively transmit the second color light Lg. The green light transmission filter may reflect the blue incident light Lib and the first and third color lights Lr and Lb.

The second color filter layer 180, which is positioned over the retroreflective layer 130g, the first and second CCLs 140 and 150, and the light-transmitting layer 160a, may selectively transmit the blue incident light Lib and reflect the first and second color lights Lr and Lg emitted by the first and second CCLs 140 and 150 in the direction of the substrate 110. Since the second color filter layer 180 reflects the first and second color lights Lr and Lg traveling away from the substrate 110 and thereby emits the first and second color lights Lr and Lg toward the direction of the substrate 110, light efficiency may be improved.

When the blue incident light Lib includes red light or green light, the green light may be transmitted outside through the first pixel region PA1 without exciting the first quantum dots 142 in the first CCL 140, and the red light may be transmitted outside through the second pixel region PA2 without exciting the second quantum dots 152 in the second CCL 150. Color purity and color reproducibility may deteriorate because green light as well as the first color light Lr are emitted by the first pixel region PA1, and red light as well as the second color light Lg are emitted by the second pixel region PA2. Color purity and color reproducibility may be improved when the second color filter layer 180 selectively transmits only the blue incident light Lib. For example, the second color filter layer 180 may be formed by alternately (e.g., alternatingly) laminating at least two layers having different refractive indexes.

The planarization layer 190 may be positioned over the second color filter layer 180 to provide a flat surface. In some embodiments, the planarization layer 190 may be positioned over the first and second CCLs 140 and 150 and the light-transmitting layer 160a, or the second color filter layer 180 may be positioned over the planarization layer 190.

Figure 14:
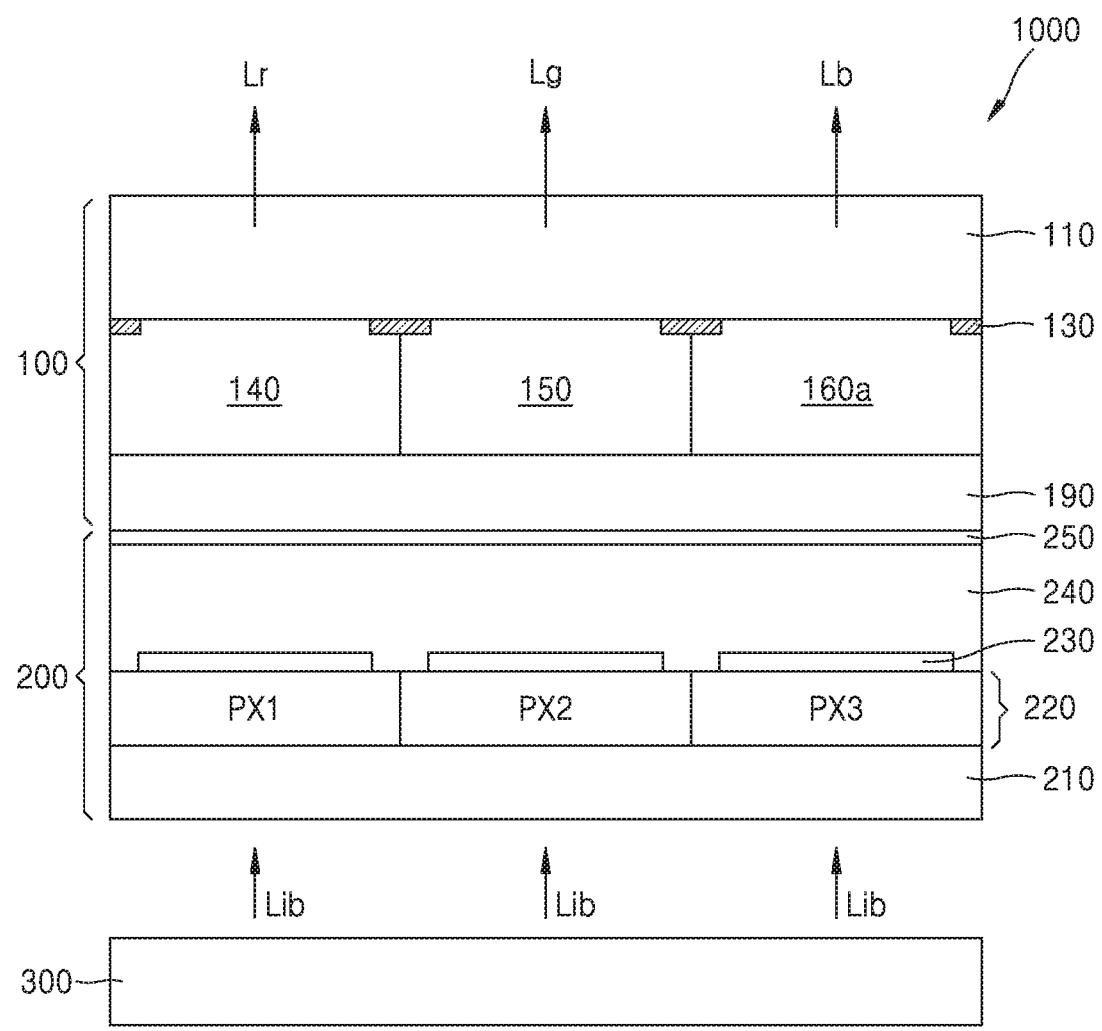
FIG. 14 is a cross-sectional view of a schematic structure of a display device according to an example embodiment of the present disclosure.

FIG. 14 is a cross-sectional view of a schematic structure of a display device according to an example embodiment of the present disclosure.

Referring to FIG. 14, a display device 1000 includes a backlight device 300, a liquid crystal display panel 200, and the color substrate 100. Although the color substrate 100 may be, for example, the color substrate 100 of FIG. 2, the color substrate 100 may be replaced by any of the color substrates 100a to 100e according to the example embodiments described above.

The backlight device 300 may provide light to form an image in the liquid crystal display panel 200. The backlight device 300 may include, e.g., a light source configured to emit the third color light Lb. In some embodiments, the backlight device 300 may include a light source configured to emit UV light. In this case, the color substrate 100e of FIG. 11 may be used instead of the color substrate 100.

The liquid crystal display panel 200 includes a lower substrate 210, a pixel circuit unit 220 positioned above the lower substrate 210, a pixel electrode 230, a liquid crystal layer 240, and a common electrode 250. The pixel circuit unit 220 includes first through third pixels PX1 through PX3. Each of the first through third pixels PX1 through PX3 controls the respective pixel electrode 230 positioned thereabove.

The color substrate 100 externally emits the first and second color lights Lr and Lg by partially converting the blue incident light Lib that is emitted by the backlight device 300 and transmitted through the liquid crystal display panel 200, and may partially transmit the third color light Lb to the outside without changing its color.

The lower substrate 210 may be formed of glass and/or a transparent plastic material. A lower polarizing unit for transmitting only light of a certain polarization from the light emitted by the backlight device 300 may be positioned at a bottom surface of the lower substrate 210. For example, the lower polarizing unit may be a polarizing plate transmitting only light that is linearly polarized in a first direction.

The pixel circuit unit 220 may include a plurality of thin-film transistors, and a gate wire and a data wire for respectively applying a gate signal and a data signal to each of the plurality of thin-film transistors.

The pixel electrode 230 may receive a data voltage by being connected to a source or drain electrode of the thin-film transistor formed at the pixel circuit unit 220.

The common electrode 250 may be formed over the planarization layer 190 of the color substrate 100. An upper polarizing unit may be positioned between the planarization layer 190 and the common electrode 250. The upper polarizing unit may be a polarizing plate transmitting light linearly polarized in a second direction that is perpendicular to the first direction. However, example embodiment of the present disclosure are not limited thereto, and the upper and lower polarizing units may both transmit light having the same polarization.

The liquid crystal layer 240 is positioned between the pixel electrode 230 and the common electrode 250, and an arrangement of liquid crystal molecules included in the liquid crystal layer 240 may be adjusted according to a voltage applied between the pixel electrode 230 and the common electrode 250. In other words, the arrangement of liquid crystal molecules in the area of the liquid crystal layer 240 between the pixel electrode 230 and the common electrode 250 may be controlled according to the voltage applied between the pixel electrode 230 and the common electrode 250, and thus the liquid crystal layer 240 may be toggled between a first mode (on) wherein a polarization of the blue incident light Lib is changed and a second mode (off) wherein a polarization of the blue incident light Lib is not changed. The liquid crystal layer 240 may also be adjusted to express intermediate gray scale values utilizing intermediate degrees of polarization of the blue incident light Lib.

The blue incident light Lib controlled by the portion of the liquid crystal layer 240 above the first pixel PX1 is converted into the first color light Lr through the first CCL 140, and the first color light Lr is externally emitted through the substrate 110. The blue incident light Lib controlled by the portion of the liquid crystal layer 240 above the second pixel PX2 is converted into the second color light Lg through the CCL 150, and the second color light Lg is externally emitted through the substrate 110. The blue incident light Lib controlled by the portion of the liquid crystal layer 240 above the third pixel PX3 passes through the light-transmitting layer 160a, and the third color light Lb is externally emitted through the substrate 110.

The color substrate 100 includes the substrate 110, the retroreflective layer 130, the first and second CCLs 140 and 150, the light-transmitting layer 160a, and the planarization layer 190. The substrate 110 includes the first through third pixel regions PA1 through PA3 spaced apart from each other, and the light shielding region BA positioned between the first through third pixel regions PA1 through PA3. The first CCL 140 is positioned in the first pixel region PA1 and converts the blue incident light Lib into the first color light Lr. The second CCL 150 is positioned in the second pixel region PA2 and converts the blue incident light Lib into the second color light Lg. The light-transmitting layer 160a is positioned in the third pixel region PA3, in which the blue incident light Lib is incident thereon and the third color light Lb is emitted therefrom. The retroreflective layer 130 is positioned over the light shielding region BA and retroreflects incident light through the first and second CCLs 140 and 150 and the light-transmitting layer 160a. The planarization layer 190 having a flat upper surface is positioned over the first and second CCLs 140 and 150 and the light-transmitting layer 160a.

The blue incident light Lib emitted by the backlight device 300 passes through the liquid crystal display panel 200 and is incident on the color substrate 100 after being turned on/off by a pixel region based on image information. A color image is displayed as the color substrate 100 externally emits the first and second color lights Lr and Lg by converting the color of a portion of the blue incident light Lib passing through the liquid crystal display panel 200, and externally emits a portion of the blue incident light Lib without changing its color. Color purity and light efficiency are improved due to the retroreflective layer 130.

Figure 15:
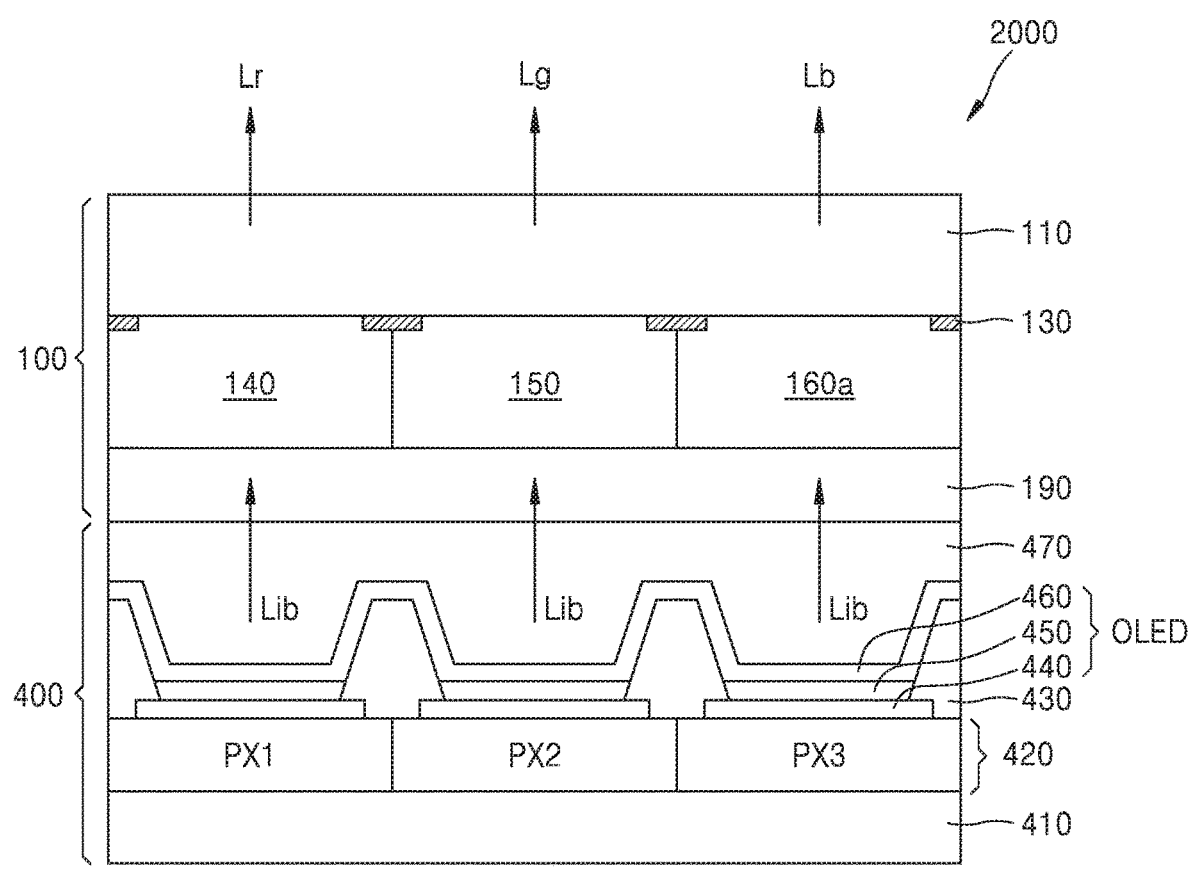
FIG. 15 is a cross-sectional view of a schematic structure of a display device according to an example embodiment of the present disclosure.

FIG. 15 is a cross-sectional view of a schematic structure of a display device according to an example embodiment of the present disclosure.

Referring to FIG. 15, a display device 2000 includes an organic light-emitting display panel 400 and the color substrate 100.

The organic light-emitting display panel 400 include the first through third pixels PX1 through PX3, and further includes organic light-emitting diodes (OLEDs) respectively controlled by the first through third pixels PX1 through PX3. Each of the OLEDs may emit third color light having a light intensity controlled by each of the first through third pixels PX1 through PX3, for example, the blue incident light Lib.

The color substrate 100 may externally emit the first and second color lights Lr and Lg by converting a portion of the blue incident light Lib emitted by the OLEDs, and externally emits a portion of the blue incident light Lib without changing its color.

In some embodiments, the OLEDs may emit UV light. In this case, the color substrate 100e of FIG. 11 may be used instead of the color substrate 100. A substrate 410 may be formed of a material such as glass, metal, and/or an organic material.

A pixel circuit layer 420 including the first through third pixels PX1 through PX3 is arranged on the substrate 410. Each of the first through third pixels PX1 through PX3 includes a plurality of thin-film transistors and a storage capacitor, and the pixel circuit layer 420 includes signal lines and a power line to transmit signals and a driving voltage applied to the first through third pixels PX1 through PX3 in addition to the first through third pixels PX1 through PX3.

The thin-film transistors may include a semiconductor layer, a gate electrode, a source electrode, and a drain electrode. The semiconductor layer may include amorphous silicon and/or polycrystalline silicon. The semiconductor layer may include an oxide semiconductor. The semiconductor layer may include a channel region, and source and drain regions that are doped with impurities.

Pixel electrodes 440 are positioned over the pixel circuit layer 420. The pixel electrode 440 may be connected to the source or drain electrode of the thin-film transistor. The pixel electrode 440 is exposed through an opening of a pixel defining layer 430, and an edge of the pixel electrode 440 may be covered by the pixel defining layer 430.

An intermediate layer 450 is positioned over the pixel electrodes 440 exposed by the pixel defining layer 430. The intermediate layer 450 includes an organic emission layer that may be formed of a low molecular organic material and/or a high molecular organic material. The intermediate layer 450 may further selectively include a functional layer such as a hole transport layer (HTL), a hole injection layer (HIL), an electron transport layer (ETL), and/or an electron injection layer (EIL) in addition to the organic emission layer.

A counter electrode 460 is positioned to cover the intermediate layer 450 and the pixel defining layer 430.

The counter electrode 460 may be a transparent or semitransparent electrode. For example, the counter electrode 460 may be formed of a metal thin-film having a low work function. The counter electrode 460 may include a transparent conductive oxide (TCO).

The pixel electrode 440, the intermediate layer 450, and the counter electrode 460 form the OLED. An encapsulation layer 470 covering the counter electrode 460 may protect the OLED from external moisture.

The blue incident light Lib emitted by the OLED controlled by the first pixel PX1 is converted into the first color light Lr through the first CCL 140, and the first color light Lr is externally emitted through the substrate 110. The blue incident light Lib emitted by the OLED controlled by the second pixel PX2 is converted into the second color light Lg through the second CCL 150, and the second color light Lg is externally emitted through the substrate 110. The blue incident light Lib emitted by the OLED controlled by the third pixel PX3 passes through the light-transmitting layer 160a, and the third color light Lb is externally emitted through the substrate 110.

The color substrate 100 includes the substrate 110, the retroreflective layer 130, the first and second CCLs 140 and 150, the light-transmitting layer 160a, and the planarization layer 190. The substrate 110 includes the first through third pixel regions PA1 through PA3 spaced apart from each other, and the light shielding region BA positioned between the first through third pixel regions PA1 through PA3. The first CCL 140 is positioned over the first pixel region PA1 and converts the blue incident light Lib into the first color light Lr. The second CCL 150 is positioned over the second pixel region PA2 and converts the blue incident light Lib into the second color light Lg. The light-transmitting layer 160a is positioned over the third pixel region PA3, in which the blue incident light Lib is incident thereon and the third color light Lb is emitted therefrom. The retroreflective layer 130 is positioned over the light shielding region BA and retroreflects incident light through the first and second CCLs 140 and 150 and the light-transmitting layer 160a. The planarization layer 190 having a flat upper surface is positioned over the first and second CCLs 140 and 150 and the light-transmitting layer 160a.

The blue incident light Lib emitted by the organic light-emitting display panel 400 is incident on the color substrate 100. A color image is displayed as the color substrate 100 externally emits the first and second color lights Lr and Lg by converting a portion of the blue incident light Lib into light of other colors, and externally emits a portion of the blue incident light Lib without changing its color.

Although FIG. 8 illustrates that the color substrate 100 is positioned over the organic light-emitting display panel 400, in some embodiments, the organic light-emitting display panel 400 may be positioned over the color substrate 100 when the organic light-emitting display panel 400 is a bottom-emission type.

It should be understood that the example embodiments described herein should be considered in a descriptive sense only and not for purposes of limitation. Descriptions of features or aspects within each example embodiment should typically be considered as being available for other similar features or aspects in other example embodiments.

As used herein, expressions such as "at least one of", "one of", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure".

In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While one or more example embodiments have been described with reference to the figures, it will be understood by those of ordinary skill in the art that various changes in form and details may be made therein without departing from the spirit and scope as defined by the following claims and equivalents thereof.

What is claimed is:

1. A substrate comprising:
   a base substrate having first and second pixel regions spaced apart from each other, and a light shielding region between the first and second pixel regions;
   a first color conversion layer over the first pixel region and configured to convert incident light into first color light;
   a second color conversion layer over the second pixel region and configured to convert the incident light into second color light;
   a base material layer; and
   beads in the base material layer to reflect light incident through the first color conversion layer and/or light incident through the second color conversion layer back into the first color conversion layer and/or the second color conversion layer,
   wherein the first color conversion layer is configured to convert the reflected light into the first color light, and/or the second color conversion layer is configured to convert the reflected light into the second color light.

2. The substrate of claim 1, wherein:
   the first color conversion layer comprises first quantum dots to emit the first color light upon being excited by the incident light, the first color light having a wavelength longer than that of the incident light; and
   the second color conversion layer comprises second quantum dots to emit the second color light upon being excited by the incident light, the second color light having a wavelength longer than that of the incident light.

3. The substrate of claim 1, further comprising a reflective layer including the base material layer and the beads and configured to reflect at least one of light incident from the first color conversion layer and light incident from the second color conversion layer.

4. The substrate of claim 1, wherein at least part of the beads are dispersed in the based material layer, the base material layer surrounding an entire surface of the at least part of the beads.

5. The substrate of claim 1, wherein at least part of the beads include a portion exposed from the base material layer.

6. The substrate of claim 1, wherein at least part of the beads comprises a first portion projecting from a surface of the base material layer and a second portion embedded in the base material layer.

7. The substrate of claim 6, wherein the at least part of the beads further comprises a partially reflective layer surrounding the second portion and exposing the first portion.

8. The substrate of claim 1, further comprising:
   a filtering layer between the base substrate and the first and second color conversion layers, the filtering layer being configured to transmit the first and second color lights, and reflect or absorb the incident light.

9. The substrate of claim 1, further comprising:
   a filtering layer over the first and second color conversion layers, the filtering layer being configured to transmit the incident light, and reflect or absorb the first and second color lights.

10. The substrate of claim 1, further comprising:
    a filtering layer surrounding side surfaces and upper surfaces of the first and second color conversion layers, the filtering layer being configured to selectively transmit the incident light; and
    a light shielding sidewall over a part of the filtering layer between the first and second color conversion layers.

11. The substrate of claim 1, further comprising:
    a light shielding sidewall surrounding at least some of side surfaces of the first and second color conversion layers; and
    a filtering layer over the first and second color conversion layers and the light shielding sidewall, the filtering layer being configured to selectively transmit the incident light.

12. The substrate of claim 1, further comprising:
    a filtering layer over a third pixel region spaced apart from the first and second pixel regions of the base substrate, the filtering layer being configured to transmit the incident light.

13. The substrate of claim 1, further comprising:
    a third color conversion layer over a third pixel region spaced apart from the first and second pixel regions of the base substrate, the third color conversion layer being configured to convert the incident light into third color light.

14. The substrate of claim 1, wherein the base material layer is between the first and second color conversion layers in a horizontal direction, and at least part of the beads comprises a portion exposed from top and side surfaces of the base material layer.

15. A substrate comprising:
    a base substrate having first and second pixel regions spaced apart from each other, and a light shielding region between the first and second pixel regions;
    a first color conversion layer over the first pixel region and configured to convert incident light into first color light;
    a second color conversion layer over the second pixel region and configured to convert the incident light into second color light; and
    a reflective layer to reflect light incident through the first color conversion layer and/or light incident through the second color conversion layer back into the first color conversion layer and/or the second color conversion layer,
    wherein the first color conversion layer is configured to convert the reflected light from the reflective layer into the first color light, and/or the second color conversion layer is configured to convert the reflected light from the reflective layer into the second color light.

16. The substrate of claim 15, wherein the reflective layer comprises a reflective surface having concave patterns.

17. The substrate of claim 16, wherein each of the concave patterns is a corner cube pattern having three reflective surfaces positioned orthogonally to each other.

18. A display device comprising:
a display unit comprising first and second pixels; and
a substrate over the display unit and having first and second pixel regions respectively overlapping the first and second pixels, the substrate comprising:
  a base substrate comprising the first and second pixel regions, and a light shielding region between the first and second pixel regions;
  a first color conversion layer over the first pixel, the first color conversion layer being configured to convert incident light into first color light;
  a second color conversion layer over the second pixel, the second color conversion layer being configured to convert the incident light into second color light;
  a base material layer; and
  beads in the base material layer to reflect light incident through the first color conversion layer and/or light incident through the second color conversion layer back into the first color conversion layer and/or the second color conversion layer,
wherein the first color conversion layer is configured to convert the reflected light into the first color light, and/or the second color conversion layer is configured to convert the reflected light into the second color light.

19. The display device of claim 18, further comprising:
a backlight device configured to irradiate the incident light to the substrate; and
a liquid crystal layer between the display unit and the substrate.

20. The display device of claim 18, wherein:
each of the first and second pixels comprises an organic emission layer to emit the incident light.

* * * * *